(12) United States Patent
Logan

(10) Patent No.: US 9,981,709 B1
(45) Date of Patent: *May 29, 2018

(54) AERODYNAMIC FRONT FORK FOR A BICYCLE

(71) Applicant: William F. Logan, Hastings-on-Hudson, NY (US)

(72) Inventor: William F. Logan, Hastings-on-Hudson, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/701,200

(22) Filed: Sep. 11, 2017

Related U.S. Application Data

(63) Continuation-in-part of application No. 15/581,145, filed on Apr. 28, 2017, now Pat. No. 9,758,208.

(51) Int. Cl.
| | | |
|---|---|---|
| *B62K 21/02* | (2006.01) | |
| *B62K 21/04* | (2006.01) | |
| *B62K 21/20* | (2006.01) | |
| *B62K 25/02* | (2006.01) | |

(52) U.S. Cl.
CPC .............. *B62K 21/02* (2013.01); *B62K 21/04* (2013.01); *B62K 21/20* (2013.01); *B62K 25/02* (2013.01)

(58) Field of Classification Search
CPC ........ B52K 21/00; B52K 21/02; B52K 21/04; B62K 21/00; B62K 21/02; B62K 21/04
See application file for complete search history.

(56) References Cited

U.S. PATENT DOCUMENTS

| | | | |
|---|---|---|---|
| 453,514 A | 6/1891 | Shier | |
| 4,480,848 A | 11/1984 | Georgiev | |
| 5,813,685 A | 9/1998 | LaRiviere | |
| 6,036,211 A * | 3/2000 | Nohr | B62K 25/24 |
| | | | 280/276 |
| 6,896,276 B1 | 5/2005 | Sparrow | |
| 7,147,237 B2 | 12/2006 | Cobb | |
| 7,413,207 B2 | 8/2008 | Yu | |
| 7,516,871 B2 | 4/2009 | Storck | |
| 7,931,289 B2 | 4/2011 | Buckenberger et al. | |
| 8,746,721 B2 * | 6/2014 | Thiers | B62K 21/00 |
| | | | 180/219 |
| 8,876,137 B2 | 11/2014 | Nicol | |
| 9,758,208 B1 | 9/2017 | Logan | |
| 2016/0236746 A1 | 8/2016 | Wong | |
| 2016/0250890 A1 | 9/2016 | Smart | |

OTHER PUBLICATIONS

FUCI, concept bike, Aug. 28, 2015, retrieved Feb. 22, 2018 from https://newatlas.com/fuci-specialized/39154/.
FUCI, various gallery images of concept bike, Aug. 28, 2015, retrieved Feb. 22, 2018 from https://newatlas.com/fuci-specialized/39154/#gallery.

* cited by examiner

*Primary Examiner* — Kevin Hurley

(74) *Attorney, Agent, or Firm* — Kolisch Hartwell, P.C.

(57) ABSTRACT

An aerodynamic front fork assembly for a bicycle may include an elongated crown portion extending from a steerer tube to a distal end behind a front wheel, with one or more fork blades projecting in a generally forward direction from the distal end of the crown portion to engage the front wheel. The crown portion may substantially fill the gap between the front wheel and the down tube of the bicycle, thereby collectively forming an airfoil with the front wheel and the down tube.

22 Claims, 17 Drawing Sheets

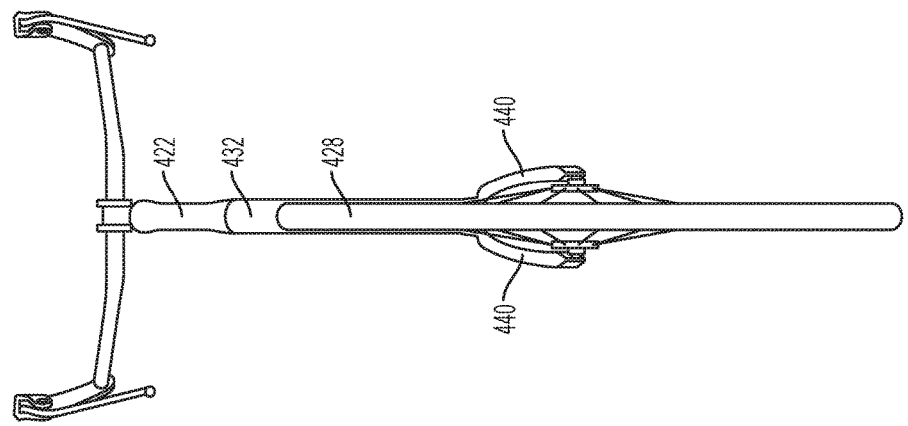
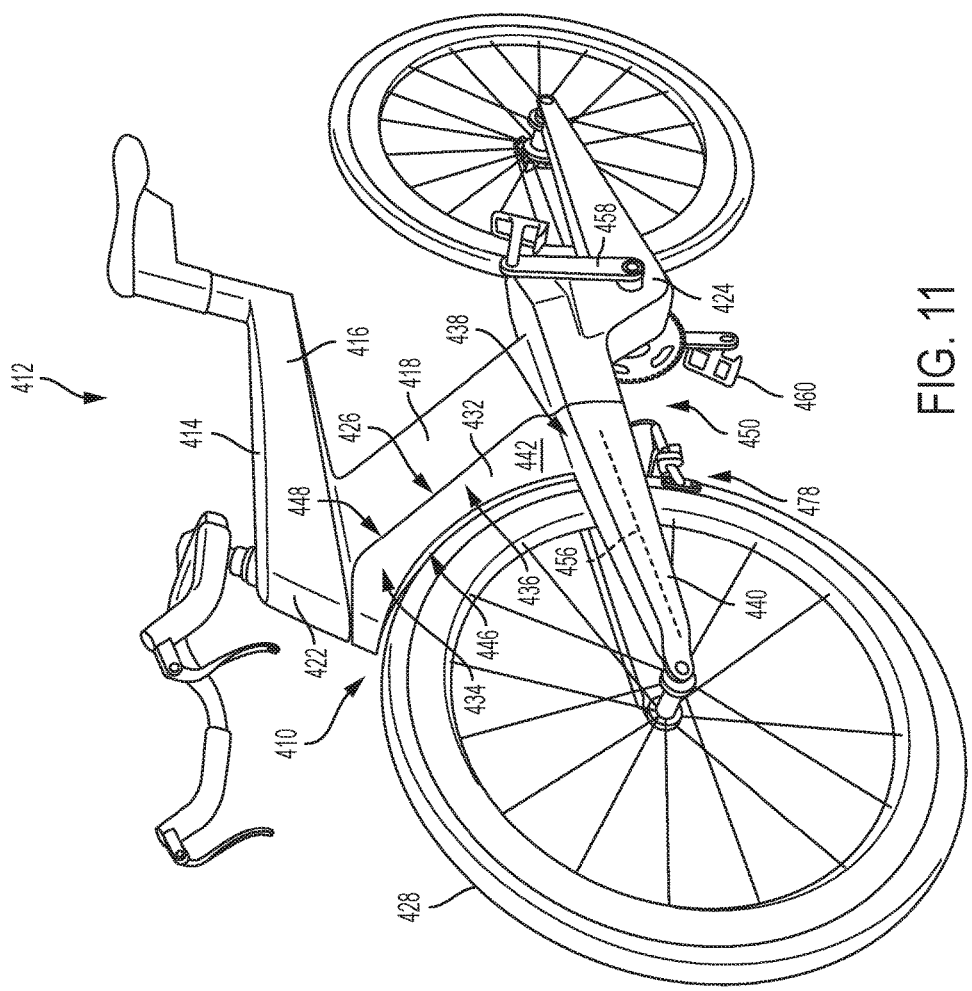

US 9,981,709 B1

AERODYNAMIC FRONT FORK FOR A BICYCLE

INTRODUCTION

The aerodynamic drag of a bicycle is an important factor affecting speed in competitive cycling events, such as triathlons, time trials, and the like. Reducing drag leads to higher speeds and better competitive results. Accordingly, improvement in the aerodynamic design of bicycles and bicycle components is highly desirable.

An airfoil is a teardrop shape that is used in fluid dynamic applications such as airplane wings, sailboats, and bicycle components to reduce drag. Another factor in reducing drag is the reduction of frontal area of the surface or surfaces that are exposed to airflow. Various bicycle designs incorporating airfoil shapes into frames have been introduced over the years. Attempts to address the issues of drag, turbulence, and speed have met with varying levels of success.

SUMMARY

The present disclosure provides systems, apparatuses, and methods relating to aerodynamic front fork assemblies for bicycles. In some embodiments, a bicycle may include a frame including a down tube; a front wheel steerably coupled to the frame by a front fork, the front fork comprising: a steerer tube pivotably coupled to a head tube of the frame; a crown having a proximal end portion coupled to the steerer tube, the crown extending from the proximal end portion to a distal end portion behind the front wheel, wherein the crown substantially fills a gap between the front wheel and the down tube; and one or more elongate fork blades protruding in a generally forward direction from the distal end portion of the crown, the front wheel being rotatably coupled to the one or more fork blades.

In some embodiments, a bicycle may include a frame including a down tube; a front wheel steerably coupled to the frame by a front fork, the front fork comprising: a steerer tube pivotably coupled to a head tube of the frame; a crown having a proximal end portion coupled to the steerer tube, the crown extending from the proximal end portion to a distal end portion behind the front wheel, wherein the crown substantially fills a gap between the front wheel and the down tube; and one or more elongate fork blades protruding in a generally forward direction from the distal end portion of the crown, the front wheel being rotatably coupled to the one or more fork blades; wherein the down tube includes a main body having a blunt trailing edge and further comprises an airfoil extension pivotably coupled to the trailing edge.

In some embodiments, a bicycle may include a frame including a down tube; a front wheel steerably coupled to the frame by a front fork, the front fork comprising: a steerer tube pivotably coupled to a head tube of the frame; a crown having a proximal end portion coupled to the steerer tube, the crown extending from the proximal end portion to a distal end portion behind the front wheel, wherein the crown substantially fills a gap between the front wheel and the down tube; one or more elongate fork blades protruding in a generally forward direction from the distal end portion of the crown, the front wheel being rotatably coupled to the one or more fork blades; wherein the down tube further comprises an extension portion protruding forward proximate the distal end portion of the crown, such that a face of the extension portion is adjacent the distal end portion of the crown.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 11 is a perspective view of another illustrative bicycle including an aerodynamic front fork assembly in accordance with aspects of the present disclosure.

FIG. 12 is a front elevation view of the bicycle of FIG. 11.

DESCRIPTION

Figure 1:
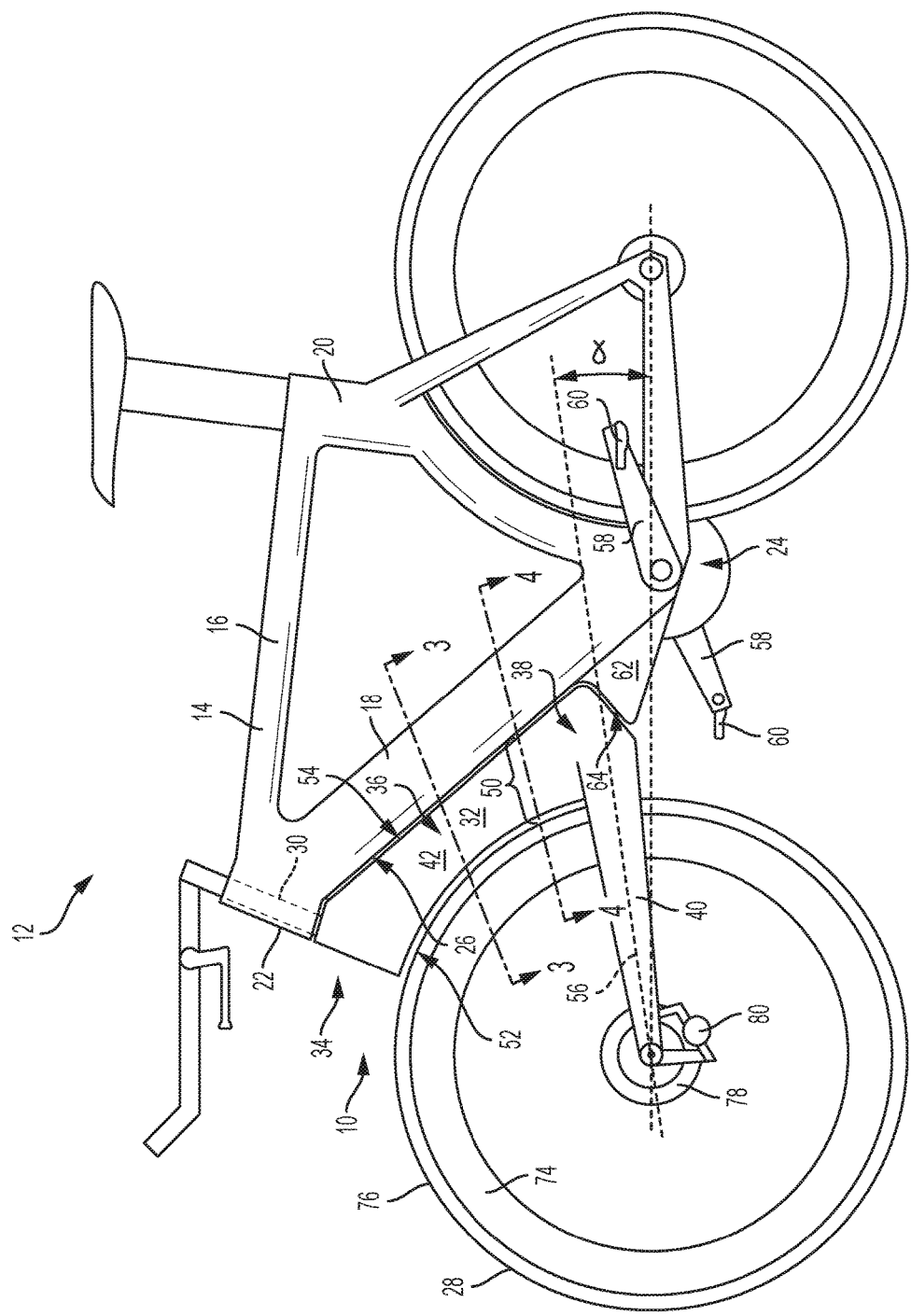
FIG. 1 is a side elevation view of an illustrative bicycle and aerodynamic front fork assembly in accordance with aspects of the present disclosure.

Various aspects and examples of an improved aerodynamic front fork assembly for a bicycle, as well as related systems and methods, are described below and illustrated in the associated drawings. Unless otherwise specified, an aerodynamic front fork assembly and/or its various components may, but are not required to, contain at least one of the structure, components, functionality, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

Definitions

The following definitions apply herein, unless otherwise indicated.

"Substantially" means to be essentially conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

Directional terms, such as "forward," "rearward," "front," and "rear" (and the like) are intended to be understood in the context of a host vehicle (e.g., bicycle) on which systems described herein may be mounted or otherwise attached. For example, "outboard" may indicate a relative position that is laterally farther from the centerline of the vehicle, or a direction that is away from the vehicle centerline. Conversely, "inboard" may indicate a direction toward the centerline, or a relative position that is closer to the centerline. Similarly, "forward" means toward the front portion of the vehicle, and "rearward" means toward the rear of the vehicle. In the absence of a host vehicle, the same directional terms may be used as if the vehicle were present. For example, even when viewed in isolation, a fork crown may have a "front" side, based on the fact that the fork would be installed with the side in question facing in the direction of the front portion of a host bicycle.

"Coupled" means connected, either permanently or releasably, whether directly or indirectly through intervening components.

Overview

In general, an aerodynamic front fork according to the present disclosure may include a space-filling crown portion extending from a proximal end at the steerer tube around a back portion of the front wheel, where a pair of fork blades extends from a distal end of the crown portion behind the front wheel in a generally forward direction.

Aerodynamic front forks according to the present teachings include a wheel support structure configured to reduce drag on the forward area of a bicycle by (a) reducing the frontal area of the components supporting the front wheel and (b) integrating these components into a single overall airfoil shape. The present disclosure describes an extended crown portion of the wheel support structure integrated into a combined assembly with a front wheel and the down tube portion of a bicycle frame to reduce frontal area and aerodynamic drag as compared to conventional vertical forks.

Known bicycles typically support the front wheel on two generally vertical blades (e.g., slightly inclined in the range of 10 to 20 degrees from vertical). These blades are connected to a crown assembly that couples the blades to each other and directly to a steerer tube, which is inclined similarly to the blades. Accordingly, conventional fork blades are essentially fully exposed in the airstream throughout their lengths, on either side of the front wheel.

In contrast, aerodynamic front forks disclosed herein have blades that are much closer to horizontal, e.g., angled between about 90 degrees to about 50 degrees from vertical, thereby exposing much less surface area to the air stream. In some examples, the blade angle is approximately 80 degrees from vertical, i.e., approximately 10 degrees from horizontal (e.g., eleven degrees from horizontal). In addition, the blades are connected to a modified, elongated crown (e.g., approximately sixteen inches in length) between the blade connection point at a lower, distal end and the steerer tube to which it is connected at an upper, proximal end. The crown also extends in a generally downward and rearward direction, substantially parallel to the inclined down-tube of the bicycle frame. In addition to connecting the fork blades to the steerer tube in a manner that produces the fork blade angle described above, the crown is shaped and sized to substantially fill the gap between the rearward portion of the front wheel and the front part of the down-tube, thereby effectively eliminating spaces and air pockets which can induce air turbulence and increase drag. This adds further to the aerodynamic effect of the overall assembly.

Front wheel support assemblies described herein may be integrated with a number of existing bicycle frame down tube profiles, including a teardrop profile as well as a squared-off airfoil sometimes referred to as a Kamm profile after the German engineer Wunibald Kamm. In some examples, an additional controllable trim tab element is integrated into the overall assembly to reduce aerodynamic drag by increasing the aspect ratio or aerodynamic chord of the assembly. The trim tab can be used to reduce heel or lateral movement of the bicycle that can sometimes be caused by cross winds. Controllability of the trim tab may be effected manually and/or by a sensor and actuator mechanism that automatically optimizes its angle based on wind speed and direction.

Examples, Components, and Alternatives

The following sections describe selected aspects of exemplary aerodynamic front fork assemblies for bicycles, as well as related systems and/or methods. The examples in these sections are intended for illustration and should not be interpreted as limiting the entire scope of the present disclosure. Each section may include one or more distinct embodiments or examples, and/or contextual or related information, function, and/or structure.

A. First Illustrative Aerodynamic Front Fork Assembly and Bicycle

As shown in FIGS. 1-5, this section describes a first illustrative embodiment of a front fork assembly, namely front fork assembly 10. Front fork assembly 10 is an example of the front fork assembly described in the Overview above, and may also be referred to as a front fork, a wheel support structure, or a wheel support assembly.

Figure 2:
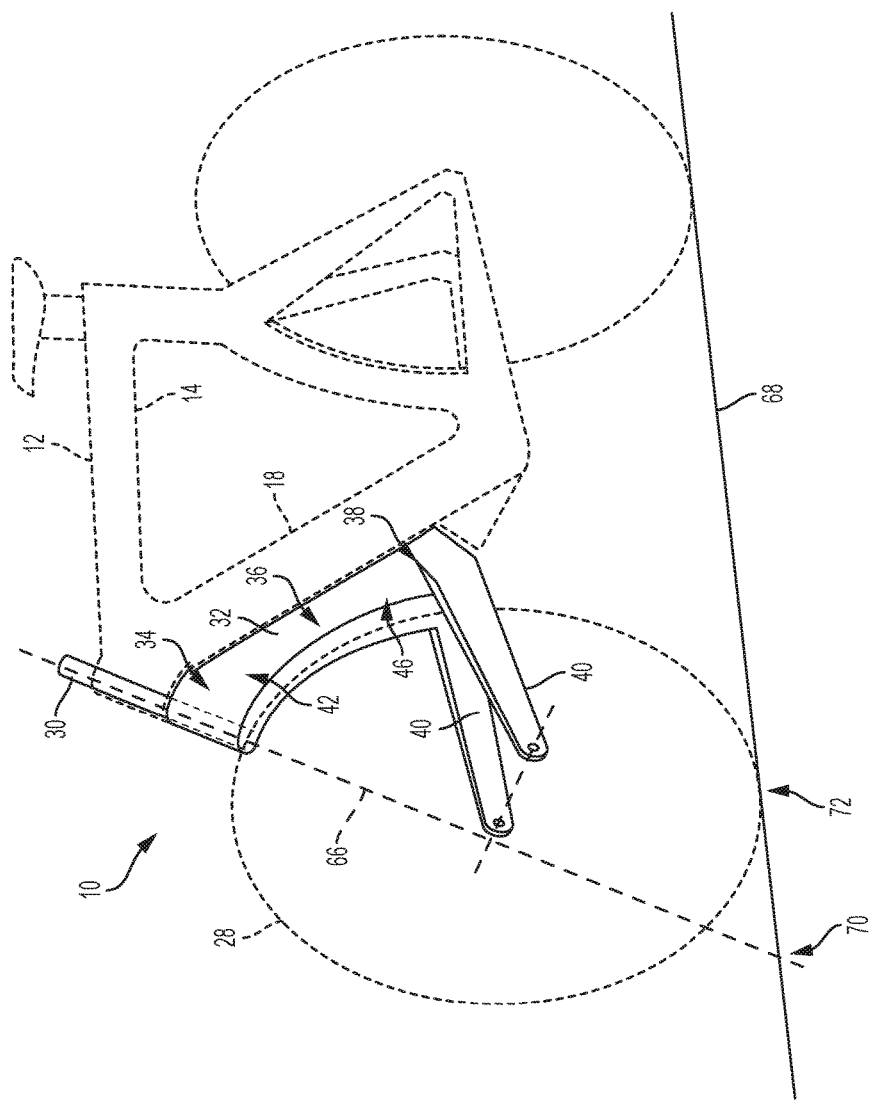
FIG. 2 is an oblique isometric view of an illustrative aerodynamic front fork assembly, with a bicycle drawn in dashed line to indicate relationships between components.
Figure 3:
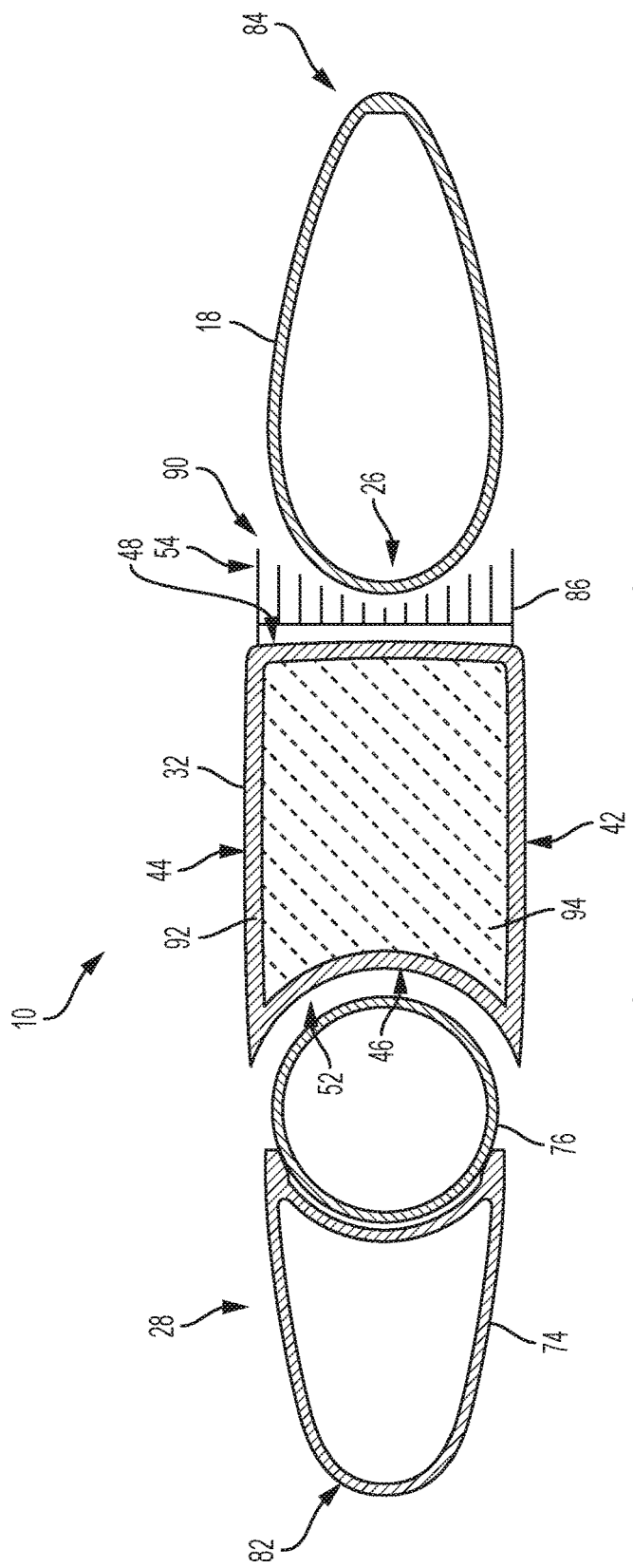
FIG. 3 is a sectional view of a front wheel, front fork assembly, and down tube of the bicycle of FIG. 1, taken at line 3-3 and showing the overall airfoil shape of this combination of components.
Figure 4:
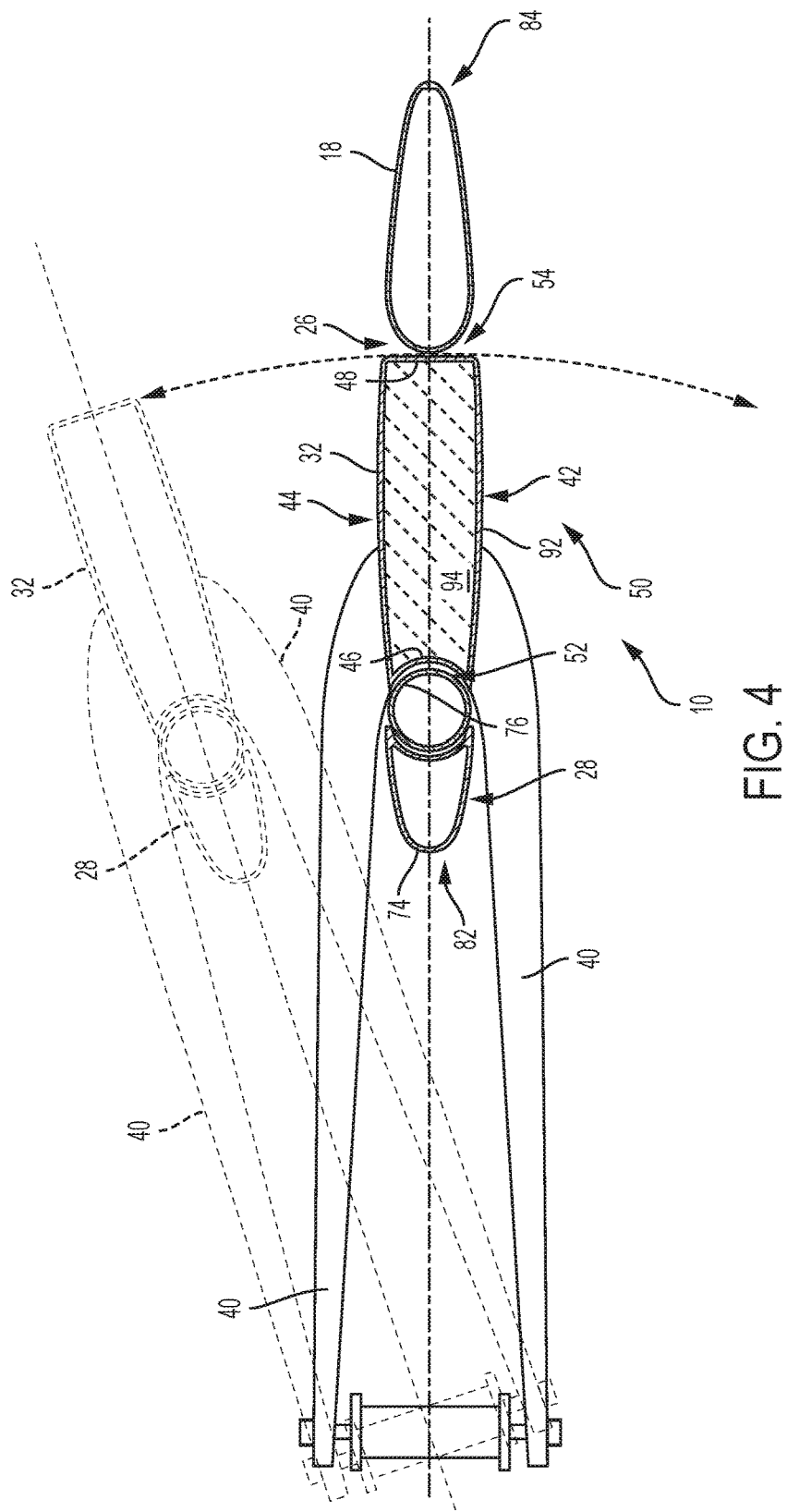
FIG. 4 is another sectional view of the components of FIG. 3, taken at line 4-4 in FIG. 1 and showing the relative motion between the fork and the down tube when steering the front wheel.
Figure 5:
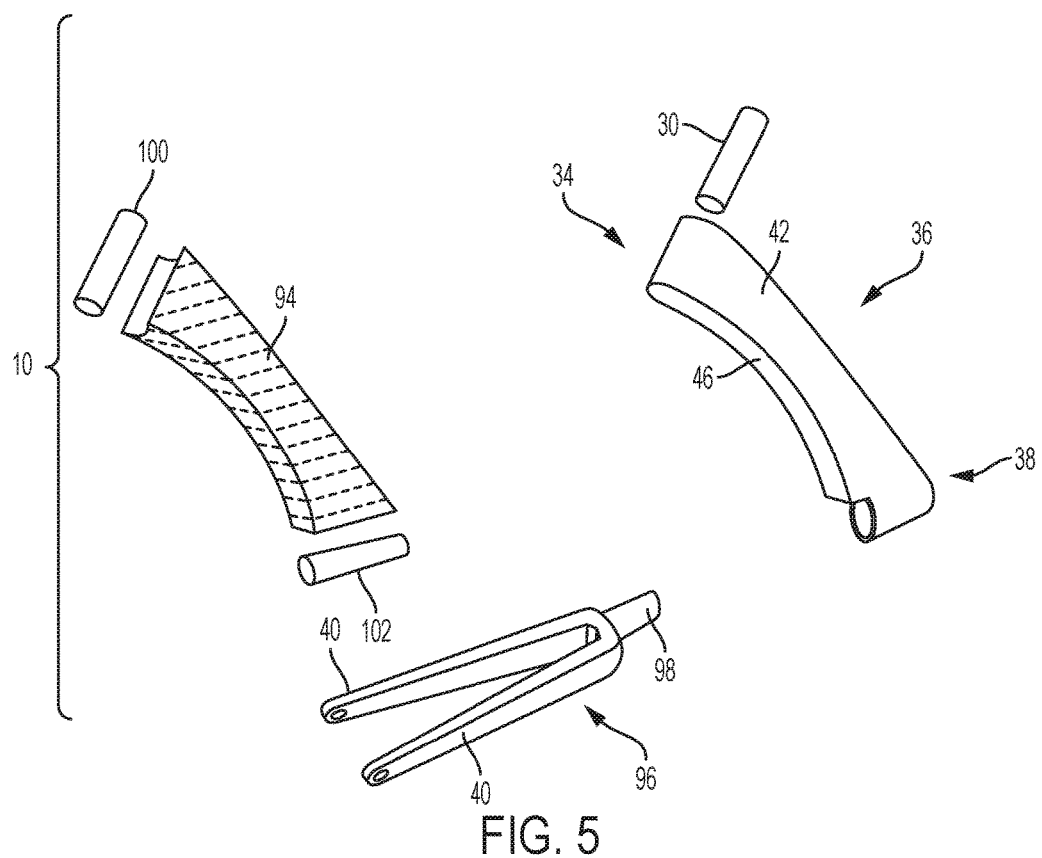
FIG. 5 is a schematic exploded view of an illustrative front fork assembly according to the present teachings.

FIG. 1 is a side elevation view of a bicycle 12 suitable for use with front fork assembly 10. FIG. 2 is an oblique isometric view of front fork assembly 10, with bicycle 12 drawn in dashed line to indicate the fork's relationship to other components. FIG. 3 is a sectional view of a front wheel of bicycle 12, a portion of front fork assembly 10, and a down tube of bicycle 12, taken at line 3-3 in FIG. 1 and showing the overall airfoil shape of this combination of components. FIG. 4 is another sectional view of the components of FIG. 3, taken at line 4-4 in FIG. 1 and showing the relative motion between the fork and the down tube when steering the front wheel. FIG. 5 is a schematic exploded view of front fork assembly 10.

With continuing reference to FIGS. 1-5, bicycle 12 includes fork assembly 10 and a frame 14. In this example, frame 14 comprises multiple frame elements, including a top tube 16, a down tube 18, and a seat tube 20. Other examples, including those described below, may include more or fewer frame elements. As with many time-trial style bikes, down tube 18 and seat tube 20 in this example have teardrop or airfoil cross sections, to reduce drag on the bicycle when in use. Down tube 18 extends at an angle from a head tube 22 to a bottom bracket 24 of bicycle 12. In this example, a leading edge 26 of down tube 18 is substantially linear. However, other designs may be suitable for use with fork assemblies in accordance with the present disclosure (e.g., down tubes having a curved leading edge).

A front wheel 28 of bicycle 12 is steerably coupled to frame 14 by front fork 10. More specifically, front fork 10 includes a steerer tube 30 pivotably coupled to head tube 22, and an elongate crown 32 having a proximal end portion 34 coupled to the steerer tube, the crown extending generally parallel to down tube 18 through an intermediate or mid portion 36 to a distal end portion 38 behind front wheel 28. One or more (in this case two) fork blades 40 protrude in a generally forward direction from distal end portion 38. Front wheel 28 is rotatably coupled to blades 40, e.g., by an axle of the wheel.

Crown 32 has a pair of side walls 42, 44 (also referred to as lateral faces) extending continuously from a front face 46 that generally follows a curved outer circumference of front wheel 28 to a rear face 48 that generally follows the front surface (i.e., leading edge 26) of the down tube. Crown 32 is sized and shaped such that the outer perimeter of the crown substantially fills a gap 50 between the front wheel and the down tube.

Substantially filling gap 50 may include any suitable taking-up of the space between the wheel and the down tube, such that wheel 28, crown 32, and down tube 18 collectively form an airfoil when the front wheel is aligned with the down tube. In other words, the substantial filling of gap 50 is sufficient to improve the aerodynamic characteristics in the vicinity of the down tube. In some examples, such aerodynamic effects are achieved when the crown fills gap 50 by at least approximately 75 percent, as measured from wheel to down tube. Less than that amount tends to produce undesirable turbulence and drag.

In some examples, a much greater filling effect is provided. For example, as shown in FIG. 1, only a narrow first space 52 is left between front face 46 of crown 32 and an outer diameter of front wheel 28. First space 52 may have any suitable dimension, e.g., approximately ⅜ of an inch plus or minus ⅛ inch, and may vary from proximal portion 34 to distal portion 38. Similarly, a narrow second space 54 is provided between rear face 48 of crown 32 and leading edge 26 of down tube 18. Second space 54 may have any suitable dimension, e.g., approximately ¼ of an inch plus or minus ⅛ inch, and may vary from proximal portion 34 to distal portion 38.

Accordingly, crown 32 may fulfill at least two functions: to reduce the aerodynamic impact of fork blade(s) 40 by positioning the proximal end of the fork blade(s) behind front wheel 28, thereby changing the fork angle, and to improve the aerodynamic profile of bicycle 12 by substantially filling gap 50.

In some examples, such as the one depicted in FIG. 1, a fork angle α may be defined as the angle created by a longitudinal axis 56 of fork(s) 40 with respect to horizontal. As described in the Overview section, bicycles typically have a fork angle of approximately 70-80 degrees. In the example of front fork 10, fork angle α is approximately ten degrees (e.g., eleven degrees) from horizontal. This slight angle permits the proximal end of fork(s) 40 to be higher up off the ground and farther forward (as compared with a completely horizontal fork angle), thereby better avoiding interference with a set of rotating cranks 58 and pedals 60.

In some examples, e.g., as shown in FIG. 1, down tube 18 includes a down tube extension 62 protruding forward from the lower end of the down tube to at least partially fill the space between bottom bracket 24 and distal portion 38 of crown 32. As shown in FIG. 1, down tube extension 62 may have a generally triangular profile when viewed from the side. In some examples, extension 62 is coupled to down tube 18. In some examples, extension 62 is unitary with down tube 18. In some examples, down tube 18 and extension 62 are formed as a single piece, creating a monolithic structure. A forward face 64 of extension 62 is adjacent distal portion 38 of crown 32. One or more additional mechanisms may be incorporated into extension 62, such as the damper assemblies described below in Sections E and G.

A long axis 66 of steerer tube 30 may have any suitable angle, including standard steerer tube angles used with conventional forks. As depicted in the example shown in FIG. 2, long axis 66 of the steerer tube passes forward of the distal ends of fork blade(s) 40. Furthermore, in this example, long axis 66 intersects with a support surface 68 (e.g., the ground) at an intersection point 70 forward of a contact patch 72 of front wheel 28. In some examples, long axis 66 may pass through or behind the axis of rotation of the front wheel, while still intersecting at a point forward of contact patch 72.

FIG. 3 depicts a sectional view through wheel 28, mid portion 36 of crown 32, and down tube 18, showing the overall aerodynamic shape of the airfoil collectively formed by these components. Wheel 28 includes a rim 74 and a tire 76. Rim 74 may include any suitable bicycle wheel rim. In the examples described herein, where front fork assembly 10 is mounted on time trial bikes, rim 74 will often be of the aero style, e.g., having a U-shaped, V-shaped, or hybrid toroidal sectional profile. Wheel 28 may further include a braking system, such as a disc 78 mounted on wheel 28 and a corresponding disc brake 80 mounted on blade 40.

Front face 46 of crown 32 is adjacent tire 76, and is concave, with a curvature oriented transverse to its arcuate lengthwise profile. This allows the crown to hug (or partially wrap around) the front wheel. Front face 46 conforms generally to the outer surface of wheel 28, which is circular overall but also presents a convex, rounded tire surface.

As depicted in FIG. 3, crown 32 has opposing lateral faces 42 and 44, which are configured and spaced from each other such that substantially continuous opposing lateral surfaces are formed from a leading edge 82 of front wheel rim 74 to a trailing edge 84 of the down tube 18. In this example, rear face 48 of crown 32 is generally planar. However, rear face 48 may instead be concave, convex, or otherwise shaped to conform more or less with down tube 18. In some examples, crown 32 may include a spacer 86, which is a fairing or strip coupled (e.g., adhered) to the rear face of the crown. Spacer 86 may include any suitable resilient material having a thickness (e.g., a variable thickness) configured to at least partially fill gap or space 54 between the crown and the down tube when the front wheel is aligned with the down tube. In this example, spacer 86 has a rear-facing outer surface 90 comprising a resilient pile. In some examples, this resilient pile may be substantially similar to the looped pile of one side of a hook-and-loop fastener.

Crown 32 comprises an outer shell 92, which may include any suitable structure configured to structurally provide the outer shape and size of the crown, and may comprise any suitably strong yet lightweight material, such as aluminum. In some examples, shell 92 may comprise a composite material, e.g., carbon fiber. Crown 32 may be hollow or partially hollow. In some examples, as indicated in FIG. 3, crown 32 may comprise a solid core 94 surrounded by shell 92. Solid core 94 may comprise any suitable material, such as a foam, a plastic, or a wood material. In this example, core 94 comprises balsa wood, and may include a plurality of end-grain balsa wood blocks that are glued together in a stack and machined to the proper shape (see manufacturing method described in Section F, below). The resulting crown 32 has a high torsional stiffness. A grain of the wood may be oriented generally parallel to a long axis of crown 32 to further enhance stiffness.

Although fork assembly 10 has a unique shape and configuration, steering of bicycle 12 is relatively standard with respect to the experience of a rider, because the steerer tube is oriented at an angle similar to a typical steerer tube. However, distal portion 38 of crown 32 and the proximal ends of fork blade(s) 40 do swing from side to side when turning front wheel 28, as illustrated in FIG. 4. Normal steering situations, especially during use in a time trial or other bicycle racing situation, will not typically require steering of the front fork assembly to the degree shown in FIG. 4. Front wheel 28 will typically be more or less aligned with down tube 18 during most operational situations.

FIG. 5 is an exploded view of one embodiment of front fork assembly 10, showing steerer tube 30, shell 92, core 94, and a blade assembly 96 comprising two blades 40 connected at a proximal end to a blade stub tube 98. (See Section G for description of an alternative embodiment). Blade assembly 96 may include any suitable wheel support structure configured to extend from distal portion 38 of crown 32 in a generally forward direction, and to securely and rotatably receive front wheel 28 in the distal ends of one or more fork blades (e.g., blades 40). Blade assembly 96 may comprise carbon fiber and/or any other suitable material. As shown in FIG. 5, the fork ends of blades 40 may include apertures for receiving an axle or hub of front wheel 28. In some examples, blades 40 may include dropouts or fork-ends for this purpose. Blades 40 may be generally straight, or in some examples may include one or more curved portions.

When assembled, the components of fork assembly 10 are secured together, such that fork assembly 10 is a solid, unitary structure having a high torsional stiffness as compared to existing fork structures that are intended to be resilient or shock-absorbing. Shell 92 encases and wraps tightly around core 94, and encompasses steerer tube 30 at one end and stub tube 98 at the other end. Additional components may be utilized to help secure the structure together, such as a steerer receiver 100 and a stub tube receiver 102. See the illustrative manufacturing method described in Section F.

As depicted in this and other examples, crown 32 may have an overall shape that is wider or thicker (e.g., from front to back) at proximal and distal portions 34, 38 than it is at mid portion 36. This is generally due to gap 50 having a corresponding shape, which results from front wheel 28 having a round or circular profile, while down tube 18 has a straight or linear profile. Accordingly, crown 32 has a varying distance between front face 46 and rear face 48. However, in some examples, leading edge 26 of down tube 18 may be curved. In those examples, crown 32 may have a correspondingly curved rear profile, which may result in less variability in front-to-rear thickness, or even a substantially constant distance between front face 46 and rear face 48.

B. Second Illustrative Aerodynamic Front Fork Assembly and Bicycle

Figure 6:
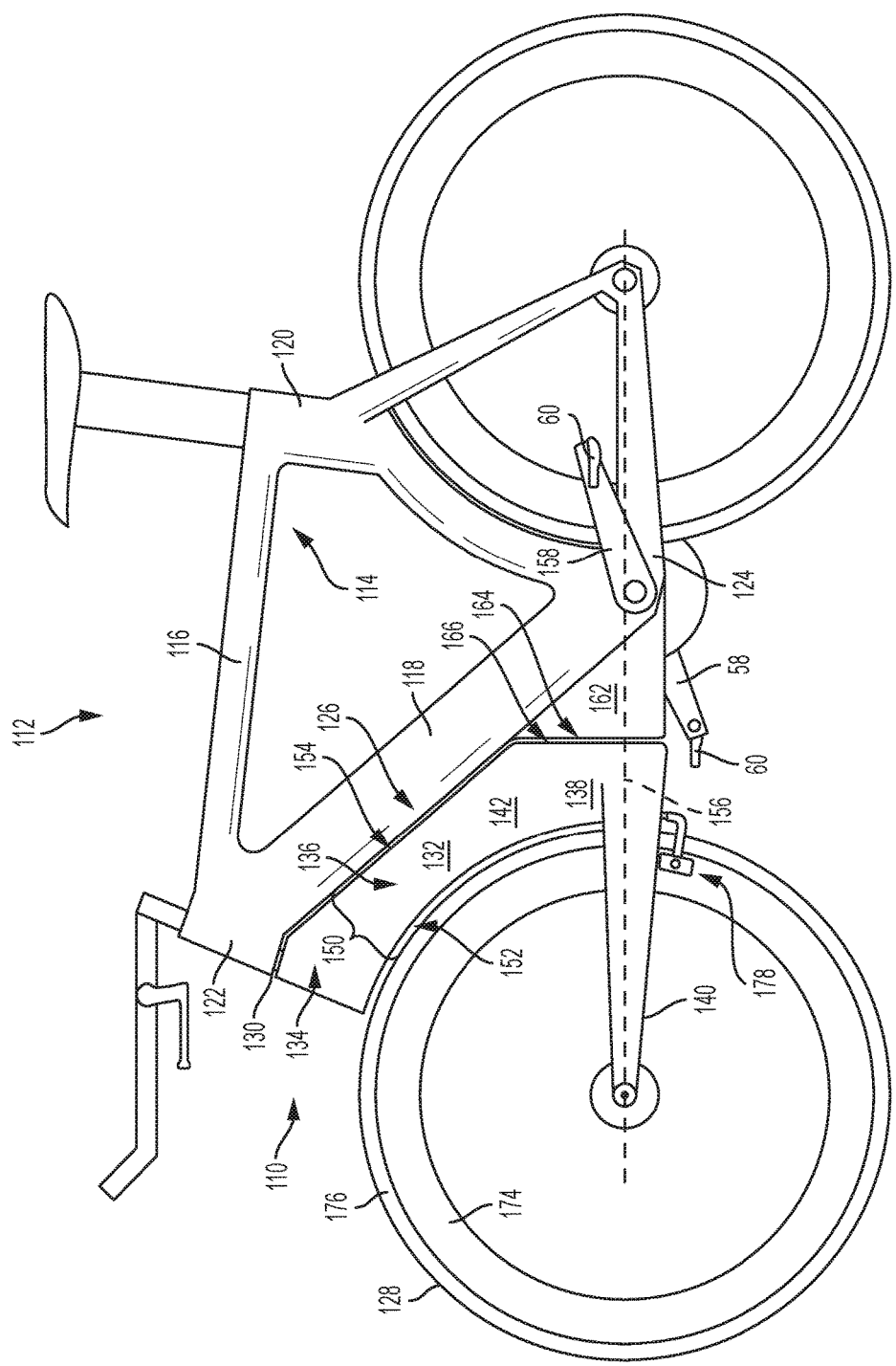
FIG. 6 is a side elevation view of another illustrative bicycle including an aerodynamic front fork assembly in accordance with aspects of the present disclosure.

As shown in FIG. 6, this section describes a second illustrative embodiment of a front fork assembly. Front fork assembly 110 is another example of the front fork assembly described in the Overview above, and is similar to fork assembly 10 of Section A. Front fork assembly 110 may be referred to as a front fork, a wheel support structure, or a wheel support assembly. Except where specifically depicted or described otherwise, components of the fork and bike described in this Section B may be substantively and functionally identical to corresponding components described in Section A.

FIG. 6 is a side elevation view of a bicycle 112, which includes fork assembly 110 and a frame 114. In this example, frame 114 comprises multiple frame elements, including a top tube 116, a down tube 118, and a seat tube 120. As with bicycle 12, down tube 118 and seat tube 120 in this example have teardrop or airfoil cross sections, to reduce drag on the bicycle when in use. Down tube 118 extends at an angle from a head tube 122 to a bottom bracket 124 of bicycle 112. In this example, a leading edge 126 of down tube 118 is substantially linear.

As with bicycle 12, a front wheel 128 of bicycle 112 is steerably coupled to frame 114 by front fork 110. An elongate crown 132 has a proximal end portion 134 coupled to the steerer tube. The crown extends generally parallel to down tube 118 through an intermediate or mid portion 136 to a distal end portion 138 behind front wheel 128. One or more fork blades 140 protrude in a generally forward direction from distal end portion 138, and front wheel 128 is rotatably coupled to blades 140. In this example, blades 140 are substantially horizontal (e.g., having an approximately zero degree fork angle).

As with crown 32, crown 132 has a pair of side walls 142 (also referred to as lateral faces) extending continuously from a front face 146 that generally follows a curved outer circumference of front wheel 128 to a rear face 148 that generally follows the front surface (i.e., leading edge 126) of the down tube. Crown 132 is sized and shaped such that the outer perimeter of the crown substantially fills a gap 150 between the front wheel and the down tube, as described in Section A above.

As shown in FIG. 6, a narrow first space 152 is left between front face 146 of crown 132 and an outer diameter of front wheel 128. First space 152 may have any suitable dimension, e.g., approximately ⅜ of an inch plus or minus ⅛ inch, and may vary from proximal portion 134 to distal portion 138. Similarly, a narrow second space 154 is provided between rear face 148 of crown 132 and leading edge 126 of down tube 118. Second space 154 may have any suitable dimension, e.g., approximately ¼ of an inch plus or minus ⅛ inch, and may vary from proximal portion 134 to distal portion 138.

Unlike fork assembly 10, a long axis 156 of each blade 140 of fork assembly 110 is substantially horizontal. To achieve this angle, distal portion 138 of crown 132 must drop lower behind front wheel 128, as compared to the example in Section A. However, the concern remains regarding interference with a set of rotating cranks 158 and pedals 160, and crown 132 must be configured to ensure the crown remains sufficiently forward of bottom bracket 124. Accordingly, rear face 148 of crown 132 drops down in a substantially vertical fashion, such that crown 132 includes a substantially vertical face 166.

Down tube 118 includes a down tube extension 162 protruding forward from the lower end of the down tube to at least partially fill the space between bottom bracket 124 and face 166 of crown 132. As discussed regarding FIG. 1 and extension 62, down tube extension 162 may have a generally triangular profile when viewed from the side. A forward face 164 of extension 162 is adjacent face 166 of crown 132. As with extension 62, one or more additional mechanisms may be incorporated into extension 162, such as the damper assemblies described below in Sections E and G.

An airfoil-shaped combined cross section similar to the one shown in FIG. 3 is also created with wheel 128, mid portion 136 of crown 132, and down tube 118. Wheel 128 includes a rim 174 and a tire 176. Rim 174 may include any suitable bicycle wheel rim, including those described with respect to rim 74. Wheel 128 may further include a braking system, which in this example includes a rim brake 178 mounted on blade 140.

C. Additional Illustrative Bicycles Utilizing an Aerodynamic Front Fork Assembly As shown in FIGS. 7-10, this section describes further examples of front fork assembly 10 incorporated into two different illustrative bicycles. Except where specifically depicted or described otherwise, components of the forks and bikes described in this Section C may be substantively and functionally identical to corresponding components described in Section A.

Figure 7:
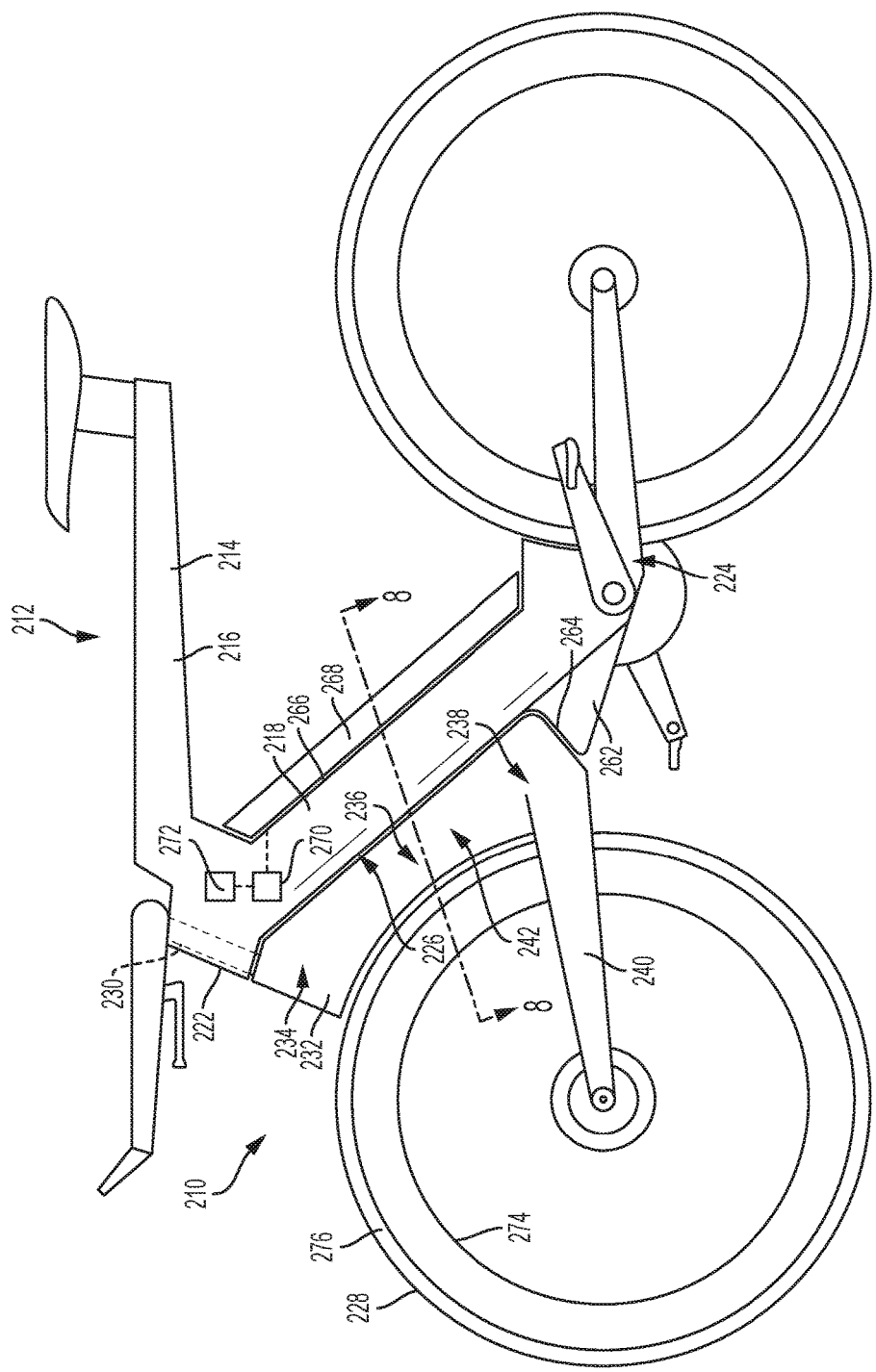
FIG. 7 is a side elevation view of another illustrative bicycle including an aerodynamic front fork assembly in accordance with aspects of the present disclosure.
Figure 8:
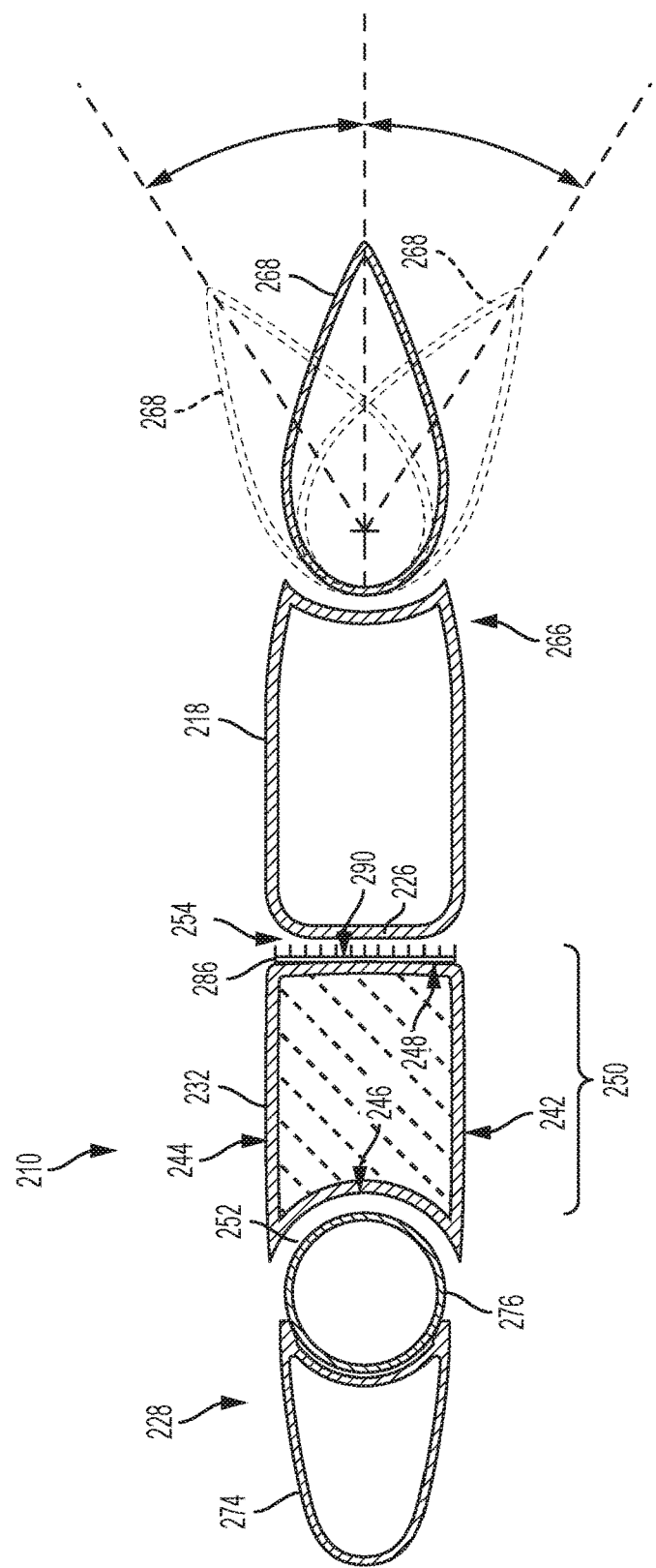
FIG. 8 is a sectional view of the front wheel, front fork assembly, and down tube of the bicycle of FIG. 7, taken at line 8-8 and showing the overall airfoil shape of this combination of components.

With reference to FIGS. 7 and 8, a front fork assembly 210 is another example of the front fork assembly described in the Overview above, and may be substantially identical to fork assembly 10 of Section A.

FIG. 7 is a side elevation view of a bicycle 212 suitable for use with front fork assembly 210. FIG. 8 is a sectional view of a front wheel of bicycle 212, a portion of front fork assembly 210, and a down tube of bicycle 212 having a controllable trailing edge portion, taken at line 8-8 in FIG. 7 and showing the overall airfoil shape of this combination of components.

With continuing reference to FIGS. 7-8, bicycle 212 includes fork assembly 210 and a frame 214. In this example, frame 214 comprises multiple frame elements, including a cantilevered top tube 216 and a down tube 218. Down tube 218 extends at an angle from a head tube 222 to a bottom bracket 224 of bicycle 212. In this example, a leading edge 226 of down tube 218 is substantially linear.

A front wheel 228 of bicycle 212 is steerably coupled to frame 214 by front fork 210. More specifically, front fork 210 includes a steerer tube 230 pivotably coupled to head tube 222, and an elongate crown 232 having a proximal end portion 234 coupled to the steerer tube, the crown extending generally parallel to down tube 218 through an intermediate or mid portion 236 to a distal end portion 238 behind front wheel 228. One or more (in this case two) fork blades 240 protrude in a generally forward direction from distal end portion 238, and front wheel 228 is rotatably coupled to blades 240, e.g., by an axle of the wheel.

Crown 232 has a pair of side walls 242, 244 (also referred to as lateral faces) extending continuously from a front face 246 that generally follows a curved outer circumference of front wheel 228 to a rear face 248 that generally follows the front surface (i.e., leading edge 226) of the down tube. Crown 232 is sized and shaped such that the outer perimeter of the crown substantially fills a gap 250 between the front wheel and the down tube. Substantially filling gap 250 may include any suitable taking-up of the space between the wheel and the down tube, as described above.

A narrow first space 252 exists between front face 246 of crown 232 and an outer diameter of front wheel 228. Similarly, a narrow second space 254 is provided between rear face 248 of crown 232 and leading edge 226 of down tube 218. First space 252 and second space 254 may have any suitable dimensions, e.g., as described with respect to corresponding spaces above, and may vary from proximal portion 234 to distal portion 238.

As described regarding FIG. 1, down tube 218 may include a down tube extension 262 protruding forward from the lower end of the down tube to at least partially fill the space between bottom bracket 224 and distal portion 238 of crown 232.

FIG. 8 depicts a sectional view taken through wheel 228, mid portion 236 of crown 232, and down tube 218, showing the overall aerodynamic shape of the airfoil collectively formed by these components. Wheel 228 includes a rim 274 and a tire 276, substantially as described above with respect to Section A. Similarly, crown 232 is substantially as described above with respect to Section A. In this example, crown 232 includes a spacer 286, comprising a resilient material having a thickness configured to at least partially fill space 254 between the crown and the down tube when the front wheel is aligned with the down tube. Spacer 286 has a rear-facing outer surface 290 comprising a resilient pile.

The main body of down tube 218, when viewed in section, has a Kamm profile with a blunt or squared-off trailing edge 266 forming a truncated teardrop shape. Down tube 218 further includes a controllable trim tab 268, also referred to as an airfoil extension, as shown in FIGS. 7 and 8. Trim tab 268 may include any suitable structure configured to extend and streamline down tube 218. Trim tab 268 is pivotable on a long axis, as indicated in FIG. 8. An angle of airfoil extension 268 may be manually and/or automatically controllable, e.g., using a controller and actuator 270. In some examples, trim tab 268 may be configured to pivot freely in the airstream (e.g., feathering). In some examples, trim tab 268 may be held at a fixed angle, e.g., by a friction hold mechanism.

In some embodiments, an angle of trim tab 268 may be automatically controlled in response to a sensed wind speed and/or direction, e.g., by placing an onboard wind sensor 272 in communication with controller and actuator 270. The angle of trim tab 268 may be controlled, e.g., to reduce turbulence and/or to bend air flow to create a component of thrust (similar to a sail or a wing).

Figure 9:
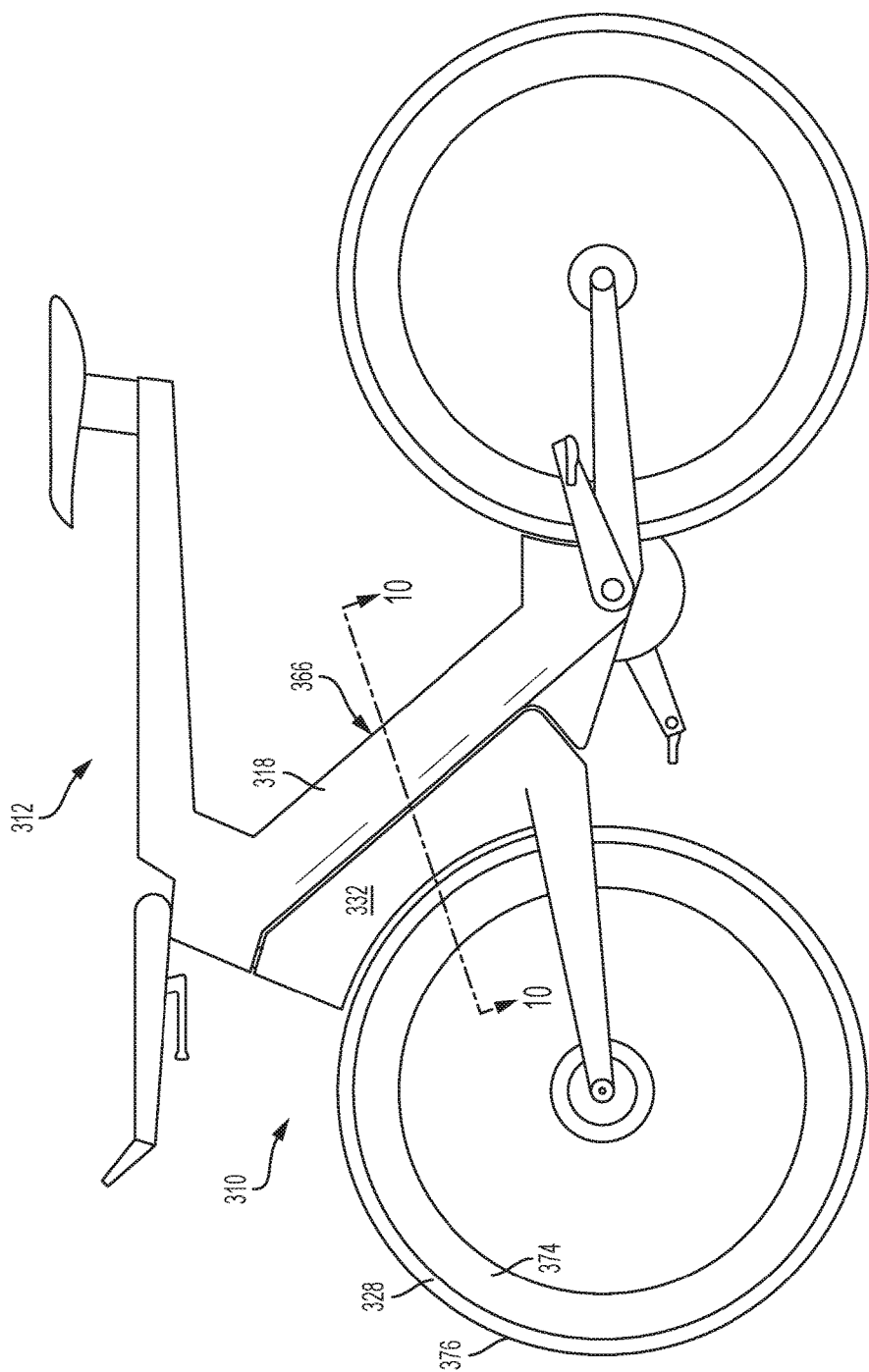
FIG. 9 is a side elevation view of yet another illustrative bicycle including an aerodynamic front fork assembly in accordance with aspects of the present disclosure.

Turning to FIG. 9, a front fork assembly 310 is depicted as part of another bicycle, namely bicycle 312, and shown in side elevation view. Front fork 310 is substantially identical to front forks 10 and 210, and all corresponding components are as described above. Bicycle 312 is substantially identical to bicycle 212, with all corresponding components as described above, except that a down tube 318 of bicycle 312 does not include the trim tab.

Figure 10:
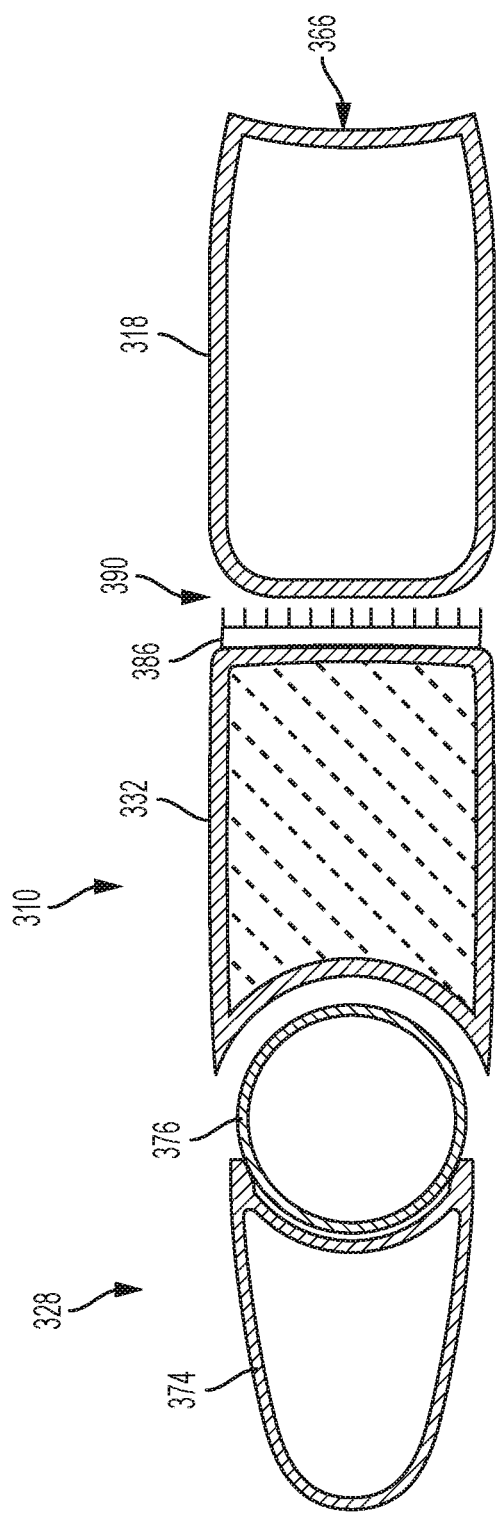
FIG. 10 depicts a sectional view taken through the wheel, front fork assembly, and down tube of the bicycle of FIG. 9, taken at 10-10 and showing the overall aerodynamic shape.

FIG. 10 depicts a sectional view taken through a wheel 328, a crown 332 of front fork 310, and down tube 318, showing the overall aerodynamic shape of the airfoil collectively formed by these components. Wheel 328 includes a rim 374 and a tire 376, and crown 332 is substantially as described above with respect to Section A. Crown 332 includes a spacer 386, comprising a resilient material having a thickness configured to at least partially fill a space between the crown and the down tube when the front wheel is aligned with the down tube. Spacer 386 again has a rear-facing outer surface 390 comprising a resilient pile. The main body of down tube 318 has a Kamm profile with a blunt or squared-off trailing edge 366 forming a truncated teardrop shape. Unlike down tube 218, this embodiment includes no trim tab.

D. Third Illustrative Aerodynamic Front Fork Assembly and Bicycle

As shown in FIGS. 11-12, this section describes a third illustrative embodiment of a front fork assembly, namely fork assembly 410. Front fork assembly 410 is another example of the front fork assembly described in the Overview above, and may be similar to fork assembly 10 of Section A and 110 of Section B. Except where specifically depicted or described otherwise, components of the fork and bike described in this Section D may be substantively and/or functionally identical to corresponding components described in Sections A and B.

FIG. 11 is a perspective view of a bicycle 412, which includes fork assembly 410 and a frame 414. In this example, frame 414 comprises multiple frame elements, including a top tube 416 and a down tube 418, forming a Y-shaped frame similar to frame 214 described above. Down tube 418 extends at an angle from a head tube 422 to a bottom bracket 424 of bicycle 412. A leading edge 426 of down tube 418 is substantially linear.

As with bicycle 12, a front wheel 428 of bicycle 412 is steerably coupled to frame 414 by front fork 410. An elongate crown 432 has a proximal end portion 434 coupled to the steerer tube. The crown extends generally parallel to down tube 418 through an intermediate or mid portion 436 to a distal portion 438 behind front wheel 428. One or more fork blades 440 protrude in a generally forward direction from distal end portion 438, and front wheel 428 is rotatably coupled to blades 440. In this example, blades 440 are angled similar to the approximately ten-degree angle of blades 40.

As with crown 32, crown 432 has a pair of side walls 442 (also referred to as lateral faces) extending continuously from a front face 446 that generally follows a curved outer circumference of front wheel 428 to a rear face 448 that generally follows the front surface (i.e., leading edge 426) of the down tube. Crown 432 is sized and shaped such that the outer perimeter of the crown substantially fills a gap 450 between the front wheel and the down tube, as described in Section A above.

A long axis 456 of each blade 440 of fork assembly 410 is angled downward slightly, from the proximal to the distal end. As with blades 40, the concern regarding interference with a set of rotating cranks 458 and pedals 460 remains, which is one reason contributing to the fork angle being greater than horizontal.

An airfoil-shaped combined cross section similar to the one shown in FIGS. 3 and/or 10 is also created with wheel 428, mid portion 436 of crown 432, and down tube 418. Wheel 428 includes a rim 474 and a tire 476. Rim 474 may include any suitable bicycle wheel rim, including those described with respect to rim 74. Wheel 428 may further include a braking system, which in this example includes a rim brake 478 mounted on blade 440.

FIG. 12 is a front elevation view of bicycle 412. Among other things, FIG. 12 depicts the reduced front-facing area of fork blades 440 with respect to airstream exposure.

E. Illustrative Damping Assembly for an Aerodynamic Front Fork Assembly

Figure 13:
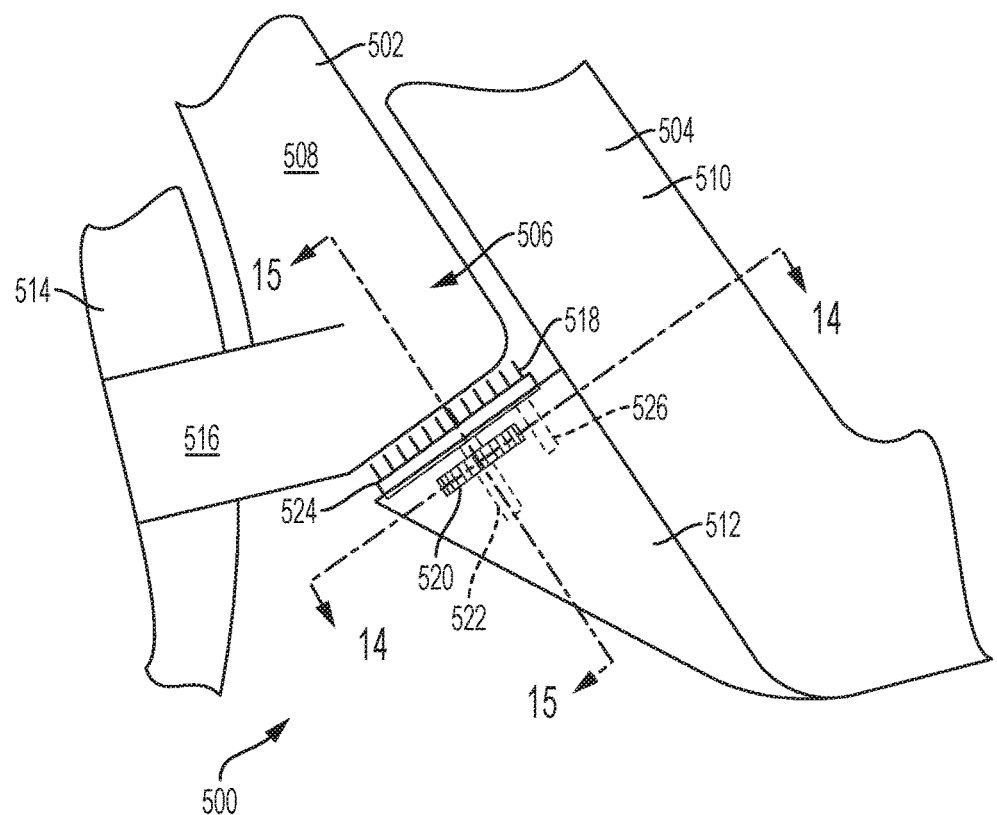
FIG. 13 is a partial side elevation view of an illustrative damping mechanism suitable for use with front forks according to the present teachings.
Figure 14:
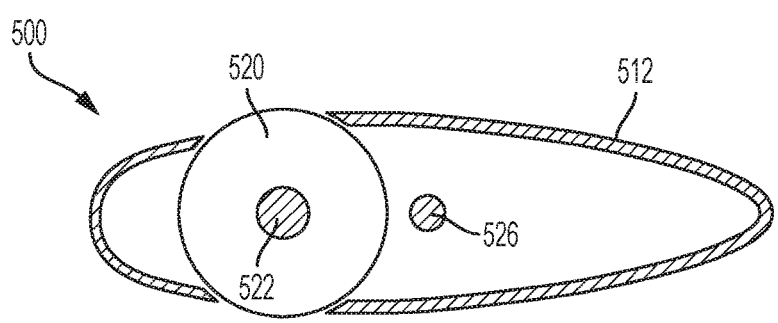
FIG. 14 is a sectional view taken at 14-14 in FIG. 13.
Figure 15:
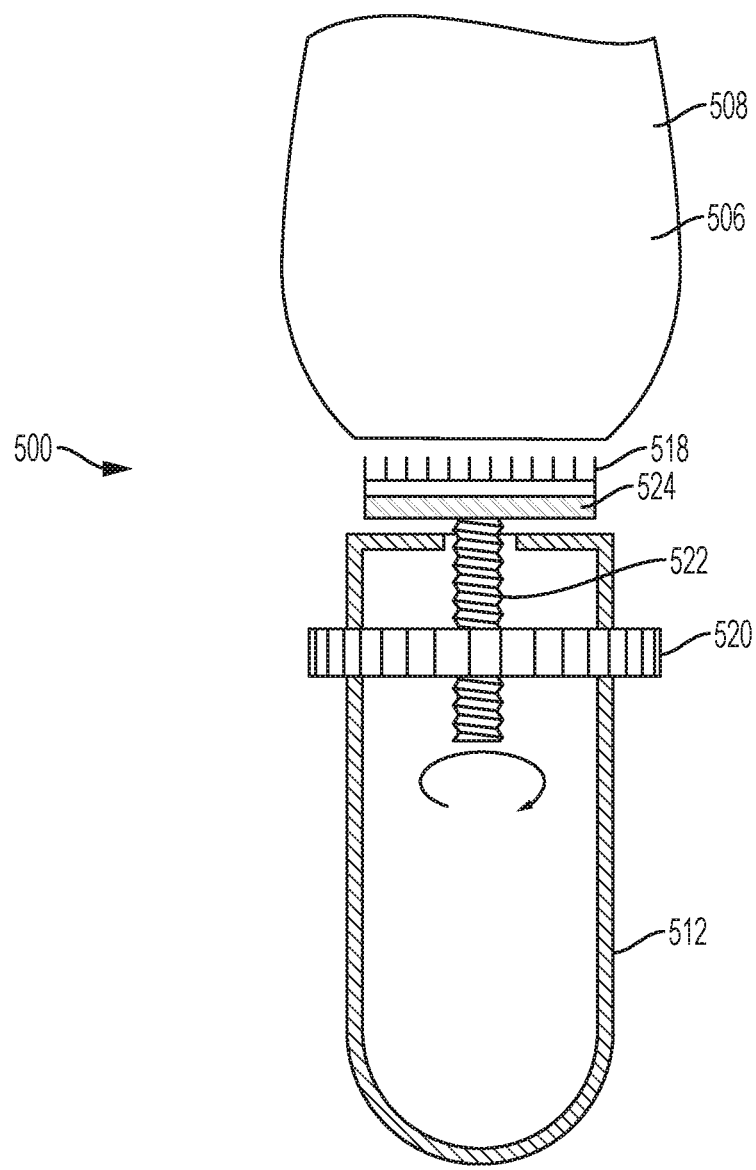
FIG. 15 is a sectional view taken at 15-15 in FIG. 13.

As shown in FIGS. 13-15, this section describes an illustrative adjustable damping mechanism 500, suitable for use with aerodynamic front fork assemblies disclosed herein. Damping mechanism 500 may be referred to as a damper assembly. Damping mechanism 500 may include any suitable apparatus configured to apply a damping surface to the crown of an aerodynamic front fork to reduce vibration-induced shuddering of the crown and/or fork blades. In this example, damping mechanism 500 is configured to apply a damping force from the bicycle frame to the aerodynamic fork, while maintaining steerability of the front wheel.

FIG. 13 is a partial side elevation view of a front fork 502 and bicycle frame 504 taken near the proximal ends of the fork blades, showing a distal end portion 506 of a crown 508. A down tube 510 and down tube extension 512 are also depicted adjacent to fork 502. Part of a wheel 514 is shown, which is coupled to fork blade 516. FIGS. 14 and 14 are sectional views as indicated in FIG. 13.

Damping mechanism 500 may be mounted or incorporated into down tube extension 512, which corresponds to extensions 62, 162, 262 described above. Damping mechanism 500 includes an adjustable-height damper pad 518, which is a resilient or compressible pad configured to apply a damping force to distal end portion 506 of the crown. The height of damper pad 518 (i.e., the distance it protrudes from extension 512 toward distal end 506) may be adjustable manually, such as by an actuator. In some examples, such as the one depicted in FIGS. 13-15, the actuator comprises an axially fixed rotatable thumb wheel 520 on a threaded stem 522 attached to a damper plate 524. Damper plate 524 is configured to hold the pad, and may be coupled to a guide pin 526 configured to prevent plate 524 from spinning freely. In some examples, the height of damper pad 518 may be automatically adjusted by an actuator controller (not shown).

Figure 16:
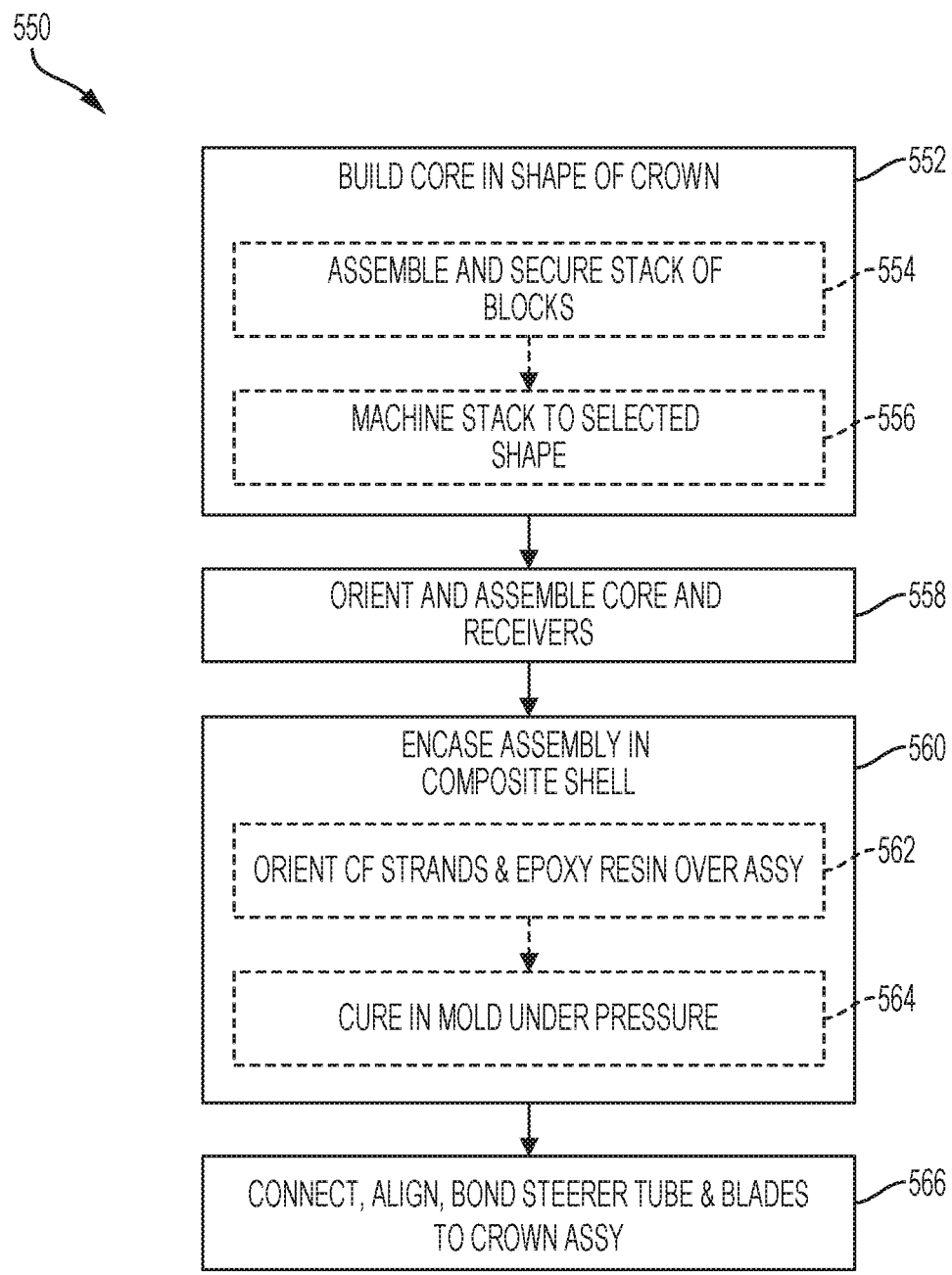
FIG. 16 is a flow chart depicting steps in an illustrative manufacturing process in accordance with aspects of the present disclosure.

F. Illustrative Method of Manufacturing an Aerodynamic Front Fork for a Bicycle This section describes steps of an illustrative method for manufacturing an illustrative aerodynamic front fork for a bicycle in accordance with aspects of the present disclosure;

see FIG. 16. This example of a method is not intended to be limiting in any sense, as many other suitable methods or variations may be utilized. Aspects of front fork assemblies and related systems described above may be included in the method steps described below. Where appropriate, reference may be made to components and systems that may be used in carrying out each step. These references are for illustration, and are not intended to limit the possible ways of carrying out any particular step of the method.

FIG. 16 is a flowchart illustrating steps performed in an illustrative method 550, and may not recite the complete process or all steps of the method. Although various steps of method 550 are described below and depicted in FIG. 16, the steps need not necessarily all be performed, and in some cases may be performed in a different order than the order shown.

Step 552 of method 550 includes building or generating a core for the crown of the fork assembly, wherein the core is shaped and sized as described above (e.g., see FIGS. 1, 2, 5, 6). This step may include any suitable materials and steps, such as carving or shaping of foam or other material blocks, injection molding of plastics and the like, casting, CNC machining, molding, and/or any combination of these. For example, step 552 may include step 554, wherein a plurality of end grain balsa wood blocks are stacked and adhered together, e.g., with the direction of the grain along the long axis of the stack. Step 556 then includes machining the assembled blocks into the shape of the crown core. For example, the crown core may have a curved profile along one long edge and a linear profile along an opposing long edge. A front face may be concave. Ends of the crown core may also be concave, to receive additional components (e.g., steerer tube, blade stub) at a later step in the process.

Step 558 of method 550 includes orienting and assembling the crown core with a steerer tube receiver (at the proximal end) and a stub tube receiver (at the distal end) to create a crown assembly (e.g., see FIG. 5). Each receiver may include any suitable materials, and may be a generally cylindrical or frustoconical tube comprising carbon fiber. Inner diameters of each of the tubes may be slightly larger than the corresponding components to be received therein. The steerer tube receiver may be slightly larger than the steerer tube, and the stub tube receiver may be slightly larger than the blade assembly stub tube. The receivers permit precise alignment of components during a later bonding step, and permit the separate fabrication or acquisition of a steerer tube and blade assembly.

Step 560 of method 550 includes encasing the crown assembly in a composite shell. This step may include any suitable carbon fiber layup technique or methodology. For example, step 560 may include step 562 wherein carbon fiber strands and epoxy resin are oriented over the crown assembly in multiple directions. Step 564 may then include curing the carbon fiber and epoxy resin in a mold, under pressure.

Step 566 of method 550 includes connecting, aligning, and bonding the steerer tube and blade assembly to the encased crown assembly (e.g., see FIG. 5). The blade assembly may include any suitable fork blades (e.g., carbon fiber blades) connectible to the crown assembly, e.g., by inserting a stub tube of the fork blades into the stub tube receiver of the crown assembly. The fork blades are connected to the distal portion of the crown assembly, oriented transverse to a long axis of the crown. This step results in a unitary, stiff fork assembly, with fork blades configured to extend in a generally forward direction when installed on a bicycle.

In some examples, the fork assembly may be skinned, e.g., by applying a thin layer of material to the fork assembly. This layer may comprise any suitable material or combination of materials, such as plastic, epoxy-reinforced cardboard, etc. Any suitable method may be used, such as vacuum forming or hand-application. In some examples the layer is applied only at junctions between components, e.g., to smooth the transition between the crown and the fork blades. In some examples, carbon fiber strands may be applied and cured after connecting the fork blades and the crown assembly.

This method results in an aerodynamic front fork assembly having an elongate crown extending at an angle from a steerer tube. The crown comprises a core encased in a composite shell, such that the core has a lengthwise arcuate front face, a rear face configured to follow the down tube of a bicycle (e.g., generally linear and planar), and two opposing side faces. The crown is securely coupled to a fork blade assembly having one or more fork blades, such that the one or more fork blades extend from the distal end portion of the crown at an angle that is transverse to a long axis of the crown.

G. Another Illustrative Front Fork and Damper Assembly

Figure 17:
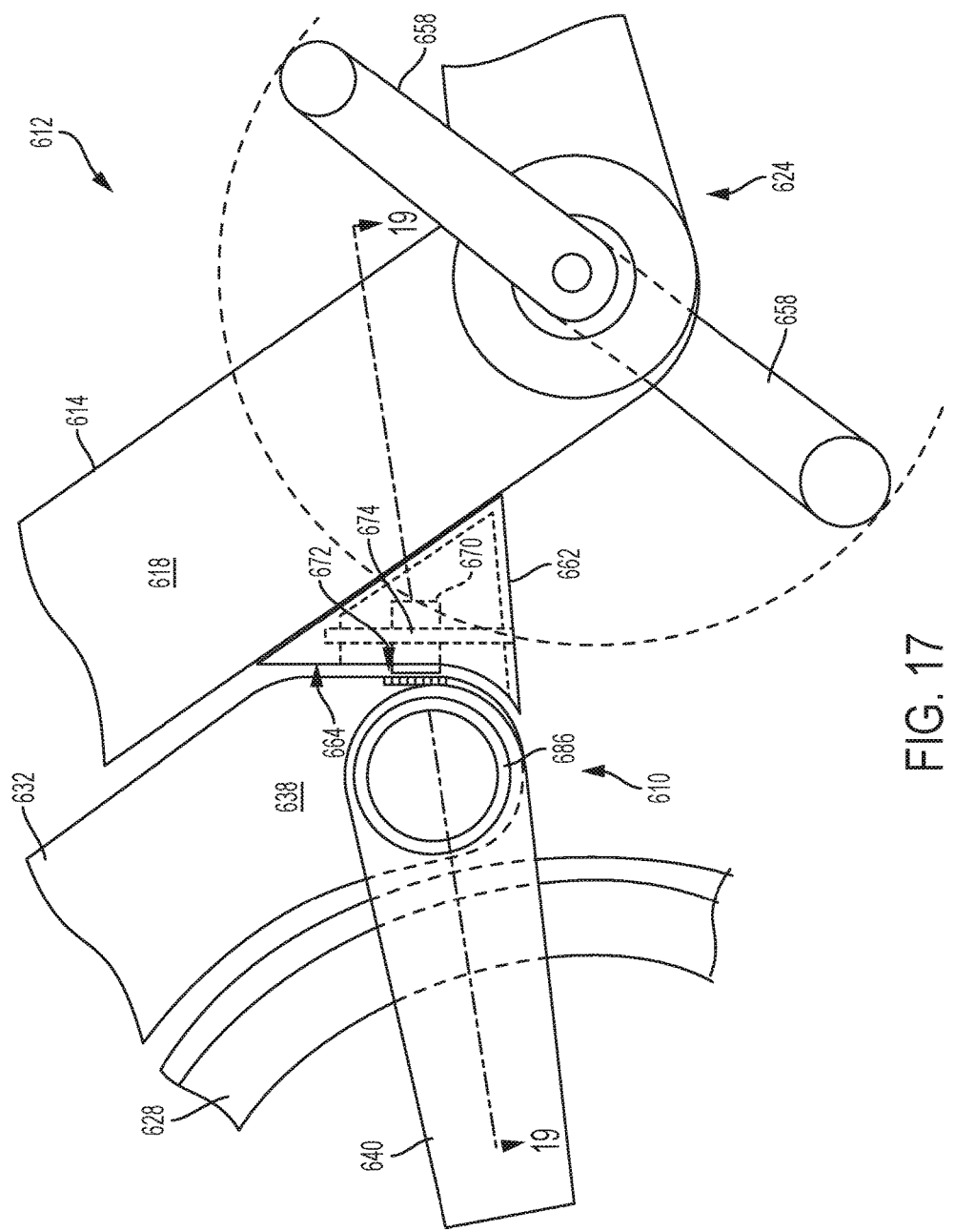
FIG. 17 is a partial side elevation view of another illustrative damping mechanism and another illustrative fork assembly.
Figure 18:
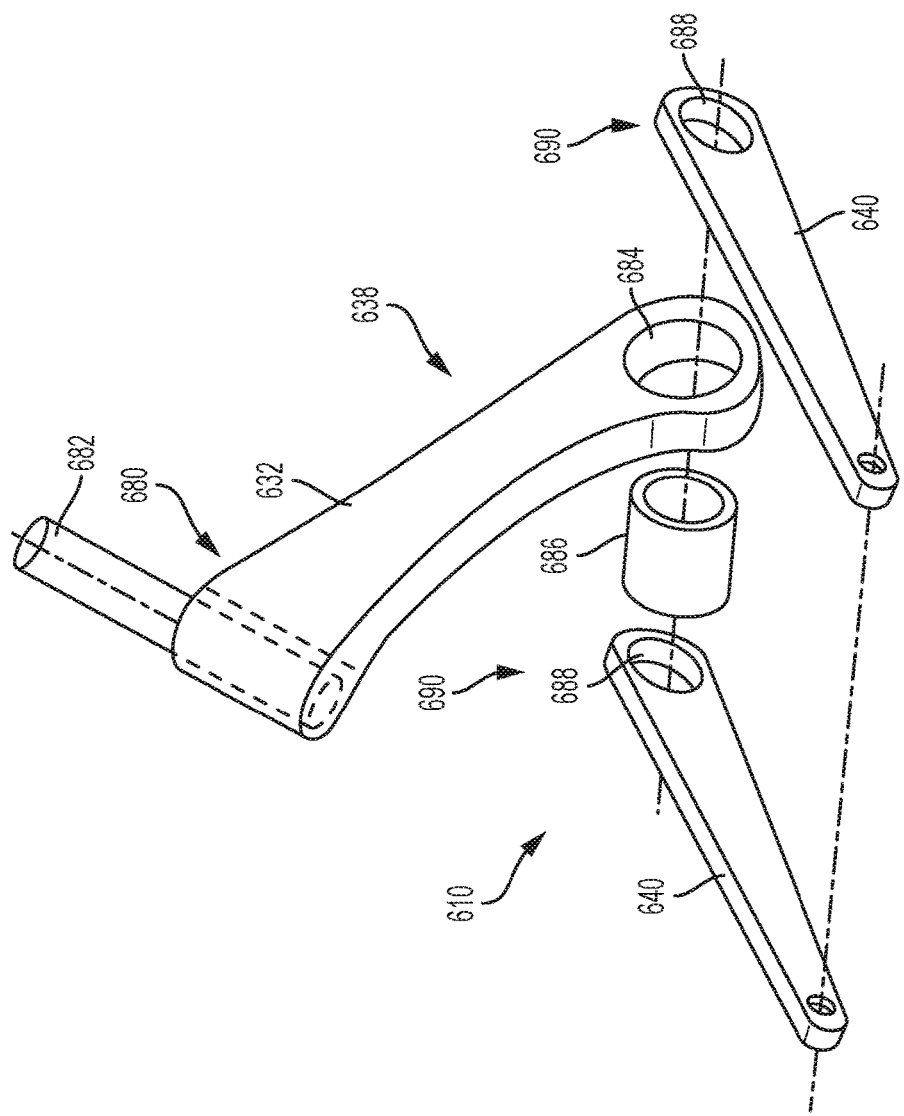
FIG. 18 is a schematic exploded view of another illustrative front fork assembly according to the present teachings
Figure 19:
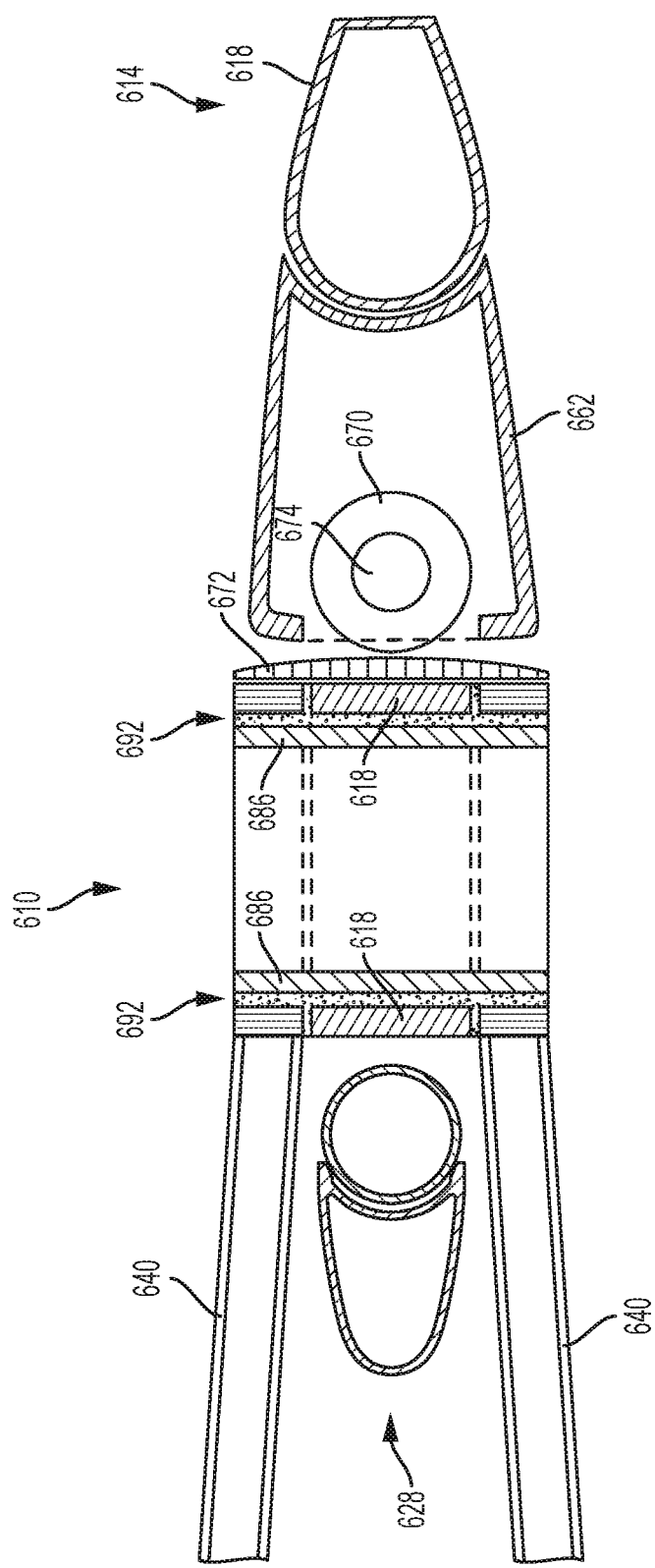
FIG. 19 is a sectional view of the components of FIG. 17, taken at line 19-19 and showing relationships between selected elements.

As shown in FIGS. 17-19, this section describes a fourth illustrative embodiment of a front fork assembly, namely fork assembly 610. Front fork assembly 610 is another example of the front fork assembly described in the Overview above, and may be similar to fork assemblies 10 of Section A, 110 of Section B, and 410 of Section D.

Except where specifically depicted or described otherwise, components of the fork and bike described in this Section G may be substantively and/or functionally identical to corresponding components described in Sections A, B, and D. This section G further describes a second illustrative embodiment of a damper assembly or mechanism similar to damper mechanism 500 (also referred to as a damping assembly or mechanism).

Any fork assembly described herein may be combined with either, neither, or both of these damper mechanisms, in any suitable fashion. Similarly, any fork assembly described herein may be combined with any bicycle and/or bicycle frame described herein, among others, in any suitable fashion.

Turning to FIG. 17, a partial side elevation view of front fork 610 and a bicycle frame 614 of a bicycle 612 is taken near the proximal ends of a fork blade 640. FIG. 17 shows a distal end portion 638 of a crown 632, as well as a down tube 618 and down tube extension 662 adjacent to crown 632 near a bottom bracket 624. A pair of cranks 658 are coupled to the bottom bracket. Part of a wheel 628 is shown, which is coupled to fork blade 640 at a distal end of the blade (not shown).

A damper assembly 668 may be mounted or incorporated into down tube extension 662, which corresponds to extensions 62, 162, 262, 512 described above. In this example, as in others, the extension portion of the down tube protrudes in a forward direction from the main body of the down tube. Extension portion 662 is proximate distal end portion 638 of crown 632, such that a forward face 664 of the extension portion is substantially vertical and adjacent the distal end portion.

As with the example described in Section E, above, extension portion 662 further comprises damper assembly 668, which is configured to apply a damping force to the distal end portion of the crown. In Section E, damper mechanism 500 includes damper pad 518, which is adjustable toward and away from the distal end portion of the crown. In this example, damper assembly 668 includes a roller 670 configured to interface (e.g., contact or press against to apply the damping force, whether continuously or intermittently) with a contact surface 672 of the distal end portion of the crown. Roller 670 is rotatable on an axle 674 (also referred to as a spindle or pin) having an axis oriented substantially parallel to the contact surface 672. Roller 670 may include any suitable structure configured to provide a rotational or pivoting contact point for the fork crown (e.g., see FIG. 4). For example, roller 670 may be cylindrical. Similar to damper pad 518, roller 670 may be adjustable toward and away from the crown. In some examples, axle 674 may be spring-biased, such that the forward-aft position of roller 670 may change somewhat as crown 632 comes into contact. Damper assembly 668 is included in the present example with a vertical orientation. However, damper assembly 668 may be used in other orientations as needed (e.g., see FIG. 13). In some examples, the rotational resistance of roller 670 may be adjustable. For example, an adjustable friction device may be included to make rotation selectively easier or harder. Such adjustability may be manual or automatic (e.g., electronic).

With continuing reference to FIG. 17, FIG. 18 shows an exploded view of fork assembly 610 similar to the view in FIG. 5. Fork assembly 610 is constructed differently than the embodiment of FIG. 5, and either construction (or a combination) may be suitable for any fork described herein.

Specifically, fork assembly 610 includes crown portion 632, which corresponds to crown portion 32 in FIG. 5 and is substantially as described above other than how the fork blades are attached. Here, crown 632 includes a proximal end portion 680 near a steerer tube 682 and an aperture 684 in distal end portion 638. Here, aperture 684 is oriented such that the aperture passes through crown 632 from side to side. A tubular sleeve 686 is sized to be press fit into aperture 684 while extending laterally beyond the sides of the crown to interface with fork blades 640. Sleeve 686 may include any structure configured to connect the crown and the blades as described. In some examples, sleeve 686 may be solid. In some examples, sleeve 686 may be hollow and open-ended. In some examples, sleeve 686 may be hollow and close-ended.

Blades 640 each include an aperture 688 at a proximal end 690, where apertures 688 are sized to receive the outer diameter (OD) of sleeve 686. Blades 640 are affixed to sleeve 686 by any suitable method, such as using an adhesive 692 (see FIG. 19). Other methods of attachment may be used instead of or in addition to adhesives, such as welding, bolting, brazing, clamping, and/or the like. In some examples, sleeve 686 and apertures 684 and/or 690 may be keyed together. Sleeve 686 may be substantially tubular or cylindrical, to correspond with circular apertures in the crown and blades, as shown in FIG. 18. However, sleeve 686 (and therefore the apertures) may have any suitable cross-sectional shape or profile, such as cylindrical, square/rectangular, polygonal (e.g., hexagonal or octagonal), star-shaped, etc., whether regular or irregular (e.g., keyed). In some examples, the shape of the sleeve (e.g., polygonal) may provide a rotational interlock feature between the sleeve, the blade(s), and the crown, thereby strengthening the crown-to-blade connections. In some examples, an outer shell may be provided that encloses the ends of sleeve 686 along with the rest of the crown.

FIG. 19 is a sectional view taken at 19-19 of FIG. 17 to show various relationships between the different components. As shown in FIG. 19, a small gap may exist between roller 670 and contact surface 672 (here shown as having a contact strip or covering). In general, however, roller 670 may come into light contact with crown 632 during normal operation, thereby providing a damping feature such as that described with respect to damper mechanism 500. However, an additional benefit of the arrangement shown in FIGS. 17 and 19 is that roller 670 may function as a limiter with respect to fore-and-aft deflection of the fork. In other words, damping assembly 668 may help maintain separation of crown 632 and down tube 618 during situations where crown 632 may otherwise flex into contact with the down tube (e.g., heavy braking).

H. Additional Examples and Illustrative Combinations

This section describes additional aspects and features of aerodynamic forks and related systems in accordance with the present disclosure, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A front fork for a bicycle, the front fork comprising:
a steerer tube;
an elongate crown coupled to the steerer tube, the crown extending at an oblique angle from a proximal end portion adjacent the steerer tube through an intermediate portion to a distal end portion, and extending from a rear face to a front face, the rear face having a linear lengthwise profile, and the front face having an arcuate lengthwise profile; and
one or more fork blades extending in a generally forward direction from the distal end portion of the crown, each of the one or more fork blades having a distal end;
wherein the front fork is configured to receive a front wheel of a bicycle, the front wheel being received by the distal ends of the one or more fork blades, the rear face of the crown generally conforming to an adjacent down tube of the bicycle, and the front face of the crown being adjacent to an outer perimeter of the front wheel, such that the crown substantially fills a gap between the front wheel and the down tube.

A1. The front fork of A0, wherein a distance between the front face and the rear face of the crown is greater at the proximal portion and at the distal portion than at the intermediate portion of the crown.

A2. The front fork of any of paragraphs A0 through A1, wherein the crown comprises an outer shell.

A3. The front fork of A2, wherein the outer shell comprises a composite material.

A4. The front fork of A3, wherein the composite material is carbon fiber.

A5. The front fork of A2, wherein the crown further comprises a solid inner core.

A6. The front fork of A5, wherein the solid inner core comprises balsa wood.

A7. The front fork of A6, wherein the solid inner core comprises a plurality of end grain balsa wood blocks adhesively connected together.

A8. The front fork of A6, wherein the balsa wood is oriented such that a grain of the balsa wood is generally parallel to an elongate axis of the crown.

A9. The front fork of any of paragraphs A0 through A8, further comprising a spacer coupled to the rear face of the crown, the spacer having an outer surface comprising a resilient pile and a thickness configured to at least partially fill a gap between the crown and the down tube when the front wheel is aligned with the down tube.

A10. The front fork of any of paragraphs A0 through A9, wherein the front face of the crown is concave, with a curvature oriented transverse to the arcuate lengthwise profile of the front face.

A11. The front fork of any of paragraphs A0 through A10, wherein the crown is configured to form an airfoil when aligned with the front wheel and the down tube.

A12. The front fork of A11, wherein the crown has opposing lateral faces configured and spaced from each other such that substantially continuous opposing lateral surfaces are formed from a leading edge of the front wheel to a trailing edge of the down tube.

A13. The front fork of any of paragraphs A0 through A12, wherein a long axis of the steerer tube passes forward of the distal ends of the one or more fork blades.

A14. The front fork of any of paragraphs A0 through A13, wherein the rear face of the crown has a substantially linear profile.

B0. A bicycle comprising:
a frame including a down tube;
a front wheel steerably coupled to the frame by a front fork, the front fork comprising:
 a steerer tube pivotably coupled to a head tube of the frame;
 a crown having a proximal end portion coupled to the steerer tube, the crown extending generally parallel to the down tube to a distal end portion behind the front wheel, the crown having a pair of side walls extending continuously from a front face that generally follows a curved outer circumference of the front wheel to a rear face that generally follows a linear front surface of the down tube, wherein the crown substantially fills a gap between the front wheel and the down tube; and
 one or more elongate fork blades protruding in a generally forward direction from the distal end portion of the crown, the front wheel being rotatably coupled to the one or more fork blades.

B1. The bicycle of B0, wherein, wherein a long axis of the one or more fork blades defines a fork angle with respect to horizontal, and the fork angle is less than approximately forty degrees.

B2. The bicycle of B1, wherein the fork angle is less than approximately fifteen degrees.

B3. The bicycle of B2, wherein the fork angle is approximately zero degrees.

B4. The bicycle of any of paragraphs B0 through B3, wherein the down tube has a non-circular cross section, and a combination of the front wheel, the crown of the fork, and the down tube forms an airfoil when the front wheel is aligned with the frame.

B5. The bicycle of B4, wherein aligned lateral sides of the wheel, the crown, and the down tube form a substantially continuous aerodynamic surface.

B6. The bicycle of any of paragraphs B0 through B5, wherein the rear face of the crown is spaced no greater than approximately ½ (e.g., ⅜) of an inch from the down tube when the crown and the down tube are aligned.

B7. The bicycle of any of paragraphs B0 through B6, wherein a length of the front face of the crown is spaced no greater than approximately ½ of an inch from the front wheel.

B8. The bicycle of any of paragraphs B0 through B7, wherein the front face of the crown is concave from side wall to side wall.

B9. The bicycle of any of paragraphs B0 through B8, wherein the crown comprises an outer shell.

B10. The bicycle of B9, wherein the outer shell comprises a composite material.

B11. The bicycle of B10, wherein the composite material is carbon fiber.

B12. The bicycle of B9, wherein the crown further comprises a solid inner core.

B13. The bicycle of B12, wherein the solid inner core comprises balsa wood.

B14. The bicycle of B13, wherein the solid inner core comprises a plurality of end grain balsa wood blocks adhesively connected together.

B15. The bicycle of B12, wherein the balsa wood is oriented such that a grain of the balsa wood is generally parallel to an elongate axis of the crown.

B16. The bicycle of any of paragraphs B0 through B15, further comprising a spacer coupled to the rear face of the crown, the spacer having an outer surface comprising a resilient pile and a thickness that substantially fills a gap between the crown and the down tube when the front wheel is aligned with the down tube.

B17. The bicycle of any of paragraphs B0 through B16, wherein a long axis of the steerer tube passes forward of the distal ends of the one or more fork blades.

B18. The bicycle of any of paragraphs B0 through B17, the down tube further comprising an extension protruding forward below the distal end portion of the crown, such that an upper face of the extension is adjacent a lower face of the distal end portion of the crown.

B19. The bicycle of B18, wherein the down tube extension further comprises a damper assembly having an adjustable-height damper pad configured to apply a damping force to the distal end portion of the crown.

B20. The bicycle of B19, wherein a height of the damper pad is manually adjustable.

B21. The bicycle of any of paragraphs B0 through B20, wherein the front fork is torsionally stiff.

C0. A bicycle comprising:
a frame including a down tube;
a front wheel steerably coupled to the frame by a front fork, the front fork comprising:
 a steerer tube pivotably coupled to a head tube of the frame;
 a crown having a proximal end portion coupled to the steerer tube, the crown extending generally parallel to the down tube to a distal end portion behind the front wheel, the crown having a pair of side walls extending continuously from a front face that generally follows a curved outer circumference of the front wheel to a rear face that generally follows a front surface of the down tube, wherein the crown substantially fills a gap between the front wheel and the down tube; and
 one or more elongate fork blades protruding in a generally forward direction from the distal end portion of the crown, the front wheel being rotatably coupled to the one or more fork blades.

C1. The bicycle of C0, wherein the down tube has an airfoil cross-section with a generally squared-off trailing edge.

C2. The bicycle of any of paragraphs C0 through C1, further comprising a pivotable trim tab extending from the trailing edge of the down tube.

C3. The bicycle of C2, wherein an angle of the pivotable trim tab is automatically adjustable in response to a sensed wind direction and wind speed.

C4. The bicycle of any of paragraphs C0 through C3, wherein the front surface of the down tube is substantially linear.

C5. The bicycle of any of paragraphs C0 through C4, wherein the crown takes up at least approximately seventy-five percent of the gap between the front wheel and the down tube.

D0. A bicycle comprising:
a frame including a down tube;
a front wheel steerably coupled to the frame by a front fork, the front fork comprising:
 a steerer tube pivotably coupled to a head tube of the frame;
 a crown having a proximal end portion coupled to the steerer tube, the crown extending from the proximal end portion to a distal end portion behind the front wheel, wherein the crown substantially fills a gap between the front wheel and the down tube; and
 one or more elongate fork blades protruding in a generally forward direction from the distal end portion of the crown, the front wheel being rotatably coupled to the one or more fork blades.

D1. The bicycle of D0, wherein, wherein a long axis of the one or more fork blades defines a fork angle with respect to horizontal, and the fork angle is less than approximately forty degrees.

D2. The bicycle of D1, wherein the fork angle is less than approximately fifteen degrees.

D3. The bicycle of D2, wherein the fork angle is approximately zero degrees.

D4. The bicycle of any of paragraphs D0 through D3, wherein the down tube has a non-circular cross section, and a combination of the front wheel, the crown of the fork, and the down tube forms an airfoil when the front wheel is aligned with the frame.

D5. The bicycle of D4, wherein aligned lateral sides of the wheel, the crown, and the down tube form a substantially continuous aerodynamic surface.

D6. The bicycle of any of paragraphs D0 through D5, wherein a rear face of the crown is spaced no greater than approximately ½ (e.g., ⅜) of an inch from the down tube when the crown and the down tube are aligned.

D7. The bicycle of any of paragraphs D0 through D6, wherein a length of a front face of the crown is spaced no greater than approximately ½ of an inch from the front wheel.

D8. The bicycle of any of paragraphs D0 through D7, wherein a front face of the crown is concave from side wall to side wall.

D9. The bicycle of any of paragraphs D0 through D8, wherein the crown comprises an outer shell.

D10. The bicycle of D9, wherein the outer shell comprises a composite material.

D11. The bicycle of D10, wherein the composite material is carbon fiber.

D12. The bicycle of D9, wherein the crown further comprises a solid inner core.

D13. The bicycle of D12, wherein the solid inner core comprises balsa wood.

D14. The bicycle of D13, wherein the solid inner core comprises a plurality of end grain balsa wood blocks adhesively connected together.

D15. The bicycle of D12, wherein the balsa wood is oriented such that a grain of the balsa wood is generally parallel to an elongate axis of the crown.

D16. The bicycle of any of paragraphs D0 through D15, further comprising a spacer coupled to the rear face of the crown, the spacer having an outer surface comprising a resilient pile and a thickness that substantially fills a gap between the crown and the down tube when the front wheel is aligned with the down tube.

D17. The bicycle of any of paragraphs D0 through D16, wherein a long axis of the steerer tube passes forward of the distal ends of the one or more fork blades.

D18. The bicycle of any of paragraphs D0 through D17, the down tube further comprising an extension protruding forward below the distal end portion of the crown, such that an upper face of the extension is adjacent a lower face of the distal end portion of the crown.

D19. The bicycle of D18, wherein the down tube extension further comprises a damper assembly configured to apply a damping force to the distal end portion of the crown.

D20. The bicycle of any of paragraphs D0 through D19, wherein the front fork is torsionally stiff.

D21. The bicycle of any of paragraphs D0 through D20, wherein the one or more fork blades are coupled to the distal end portion of the crown by a single sleeve passing through respective apertures in the fork blades and the crown.

D22. The bicycle of D21, wherein the sleeve is tubular.

D23. The bicycle of D21, wherein the fork blades are affixed to the sleeve by an adhesive (e.g., an epoxy).

E0. A bicycle comprising:
a frame including a down tube;
a front wheel steerably coupled to the frame by a front fork, the front fork comprising:
 a steerer tube pivotably coupled to a head tube of the frame;
 a crown having a proximal end portion coupled to the steerer tube, the crown extending from the proximal end portion to a distal end portion behind the front wheel, wherein the crown substantially fills a gap between the front wheel and the down tube; and
 one or more elongate fork blades protruding in a generally forward direction from the distal end portion of the crown, the front wheel being rotatably coupled to the one or more fork blades;
wherein the down tube includes a main body having a blunt trailing edge and further comprises an airfoil extension pivotably coupled to the trailing edge.

E1. The bicycle of E0, wherein a combination of the front wheel, the crown of the fork, the main body of the down tube, and the airfoil extension collectively forms an airfoil when the front wheel is aligned with the frame.

E2. The bicycle of E1, wherein aligned lateral sides of the wheel, the crown, the main body of the down tube, and the airfoil extension form a substantially continuous aerodynamic surface.

E3. The bicycle of any of paragraphs E0 through E2, wherein the airfoil extension is configured to pivot freely in the airstream.

E4. The bicycle of any of paragraphs E0 through E3, wherein the airfoil extension is selectably securable at a plurality of fixed angles relative to the main body of the down tube.

E5. The bicycle of any of paragraphs E0 through E4, further comprising an actuator coupled to the airfoil extension and configured to pivot the airfoil extension relative to the main body of the down tube.

F0. A bicycle comprising:
  a frame including a down tube;
  a front wheel steerably coupled to the frame by a front fork, the front fork comprising:
    a steerer tube pivotably coupled to a head tube of the frame;
    a crown having a proximal end portion coupled to the steerer tube, the crown extending from the proximal end portion to a distal end portion behind the front wheel, wherein the crown substantially fills a gap between the front wheel and the down tube;
    one or more elongate fork blades protruding in a generally forward direction from the distal end portion of the crown, the front wheel being rotatably coupled to the one or more fork blades;
  wherein the down tube further comprises an extension portion protruding forward proximate the distal end portion of the crown, such that a face of the extension portion is adjacent the distal end portion of the crown.

F1. The bicycle of F0, wherein the down tube extension further comprises a damper assembly configured to apply a damping force to the distal end portion of the crown.

F2. The bicycle of F1, wherein the damper assembly includes a damper pad adjustable toward and away from the distal end portion of the crown.

F3. The bicycle of F1, wherein the damper assembly includes a roller configured to interface with a contact surface of the distal end portion of the crown, the roller being rotatable on an axis oriented substantially parallel to the contact surface.

F4. The bicycle of F3, wherein the roller of the damper assembly is cylindrical.

F5. The bicycle of F3, wherein the contact surface of the distal end portion of the crown has a substantially vertical orientation.

Advantages, Features, Benefits

The different embodiments and examples of the aerodynamic front fork assemblies described herein provide several advantages over known solutions. For example, illustrative embodiments and examples described herein reduce aerodynamic drag on the bicycle by placing the wheel support blades at a near horizontal angle with the blade-supporting crown component behind the front wheel, and further by mostly filling the space between the wheel and the down tube of the bicycle frame.

Additionally, and among other benefits, illustrative embodiments and examples described herein provide a damping mechanism to control road-induced vibrations or oscillations and cross wind effects and enable a smoother ride than with conventional front wheel support designs.

Additionally, and among other benefits, illustrative embodiments and examples described herein permit incorporation of the fork assembly with existing bicycle frame designs and components so that a bicycle's performance can be improved without extensive expense and labor.

Additionally, and among other benefits, illustrative embodiments and examples described herein enable the use of either disc brakes or rim brakes on the front wheel.

Additionally, and among other benefits, illustrative embodiments and examples described herein may integrate a tool or storage space and a fairing as a part of the damper mechanism housing.

Additionally, and among other benefits, illustrative embodiments and examples described herein lower the center of gravity of the bicycle by relocating fork components as compared with standard forks (i.e., by moving the wheel support blades more in line with the front wheel axle). This consequently improves handling.

Additionally, and among other benefits, illustrative embodiments and examples described herein create a novel and striking appearance. The basic form of the bicycle has not changed much for over one hundred years. In one embodiment, the design is simplified and reduced to a horizontal rider support platform and a horizontal wheel support structure connected by an inclined wing-like structure (see FIG. 11). In contrast, existing designs usually consist of a visually-complex tubular diamond frame and vertical fork assembly.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:
1. A bicycle comprising:
  a frame including a down tube;
  a front wheel steerably coupled to the frame by a front fork, the front fork comprising:
    a steerer tube pivotably coupled to a head tube of the frame;
    a crown having a proximal end portion coupled to the steerer tube, the crown extending from the proximal end portion to a distal end portion behind the front wheel, wherein the crown substantially fills a gap between the front wheel and the down tube; and
    one or more elongate fork blades protruding in a generally forward direction from the distal end portion of the crown, the front wheel being rotatably coupled to the one or more fork blades;
  wherein the crown, the front wheel, and the down tube are configured to collectively form an airfoil.

2. The bicycle of claim 1, wherein, wherein a long axis of the one or more fork blades defines a fork angle with respect to horizontal, and the fork angle is less than approximately fifteen degrees.

3. The bicycle of claim 1, wherein a rear face of the crown is spaced no greater than approximately ½ of an inch from the down tube when the crown and the down tube are aligned.

4. The bicycle of claim 1, wherein a front face of the crown is concave from side wall to side wall.

5. The bicycle of claim 1, wherein the one or more fork blades are coupled to the distal end portion of the crown by a single sleeve passing through respective apertures in the fork blades and the crown.

6. The bicycle of claim 5, wherein the sleeve is tubular.

7. The bicycle of claim 5, wherein the fork blades are affixed to the sleeve by an adhesive.

8. A bicycle comprising:
a frame including a down tube;
a front wheel steerably coupled to the frame by a front fork, the front fork comprising:
  a steerer tube pivotably coupled to a head tube of the frame;
  a crown having a proximal end portion coupled to the steerer tube, the crown extending from the proximal end portion to a distal end portion behind the front wheel, wherein the crown substantially fills a gap between the front wheel and the down tube; and
  one or more elongate fork blades protruding in a generally forward direction from the distal end portion of the crown, the front wheel being rotatably coupled to the one or more fork blades;
wherein the down tube includes a main body having a blunt trailing edge and further comprises an airfoil extension pivotally coupled to the trailing edge.

9. The bicycle of claim 8, wherein a combination of the front wheel, the crown of the fork, the main body of the down tube, and the airfoil extension collectively forms an airfoil when the front wheel is aligned with the frame.

10. The bicycle of claim 9, wherein aligned lateral sides of the wheel, the crown, the main body of the down tube, and the airfoil extension form a substantially continuous aerodynamic surface.

11. The bicycle of claim 8, wherein the airfoil extension is configured to pivot freely.

12. The bicycle of claim 8, wherein the airfoil extension is selectably securable at a plurality of fixed angles relative to the main body of the down tube.

13. The bicycle of claim 8, further comprising an actuator coupled to the airfoil extension and configured to pivot the airfoil extension relative to the main body of the down tube.

14. A bicycle comprising:
a frame including a down tube;
a front wheel steerably coupled to the frame by a front fork, the front fork comprising:
  a steerer tube pivotably coupled to a head tube of the frame;
  a crown having a proximal end portion coupled to the steerer tube, the crown extending from the proximal end portion to a distal end portion behind the front wheel, wherein the crown substantially fills a gap between the front wheel and the down tube, and wherein the crown, the front wheel, and the down tube are configured to collectively form an airfoil;
one or more elongate fork blades protruding in a generally forward direction from the distal end portion of the crown, the front wheel being rotatably coupled to the one or more fork blades;
wherein the down tube further comprises an extension portion protruding forward proximate the distal end portion of the crown, such that a face of the extension portion is adjacent the distal end portion of the crown.

15. The bicycle of claim 14, wherein the down tube extension further comprises a damper assembly configured to apply a damping force to the distal end portion of the crown.

16. The bicycle of claim 15, wherein the damper assembly includes a damper pad adjustable toward and away from the distal end portion of the crown.

17. The bicycle of claim 15, wherein the damper assembly includes a roller configured to interface with a contact surface of the distal end portion of the crown, the roller being rotatable on an axis oriented substantially parallel to the contact surface.

18. The bicycle of claim 17, wherein the roller of the damper assembly is cylindrical.

19. The bicycle of claim 17, wherein the contact surface of the distal end portion of the crown has a substantially vertical orientation.

20. The bicycle of claim 14, wherein the face of the extension portion adjacent the distal end portion of the crown has a substantially vertical orientation.

21. A bicycle comprising:
a frame including a down tube;
a front wheel steerably coupled to the frame by a front fork, the front fork comprising:
  a steerer tube pivotably coupled to a head tube of the frame;
  a crown having a proximal end portion coupled to the steerer tube, the crown extending from the proximal end portion to a distal end portion behind the front wheel, wherein the crown substantially fills a gap between the front wheel and the down tube; and
  one or more elongate fork blades protruding in a generally forward direction from the distal end portion of the crown, the front wheel being rotatably coupled to the one or more fork blades;
wherein the crown is configured such that substantially continuous opposing lateral surfaces are formed by the front wheel, the crown, and the down tube when the crown is aligned with the down tube.

22. A bicycle comprising:
a frame including a down tube;
a front wheel steerably coupled to the frame by a front fork, the front fork comprising:
  a steerer tube pivotably coupled to a head tube of the frame;
  a crown having a proximal end portion coupled to the steerer tube, the crown extending from the proximal end portion to a distal end portion behind the front wheel, wherein the crown and the front wheel are substantially non-overlapping when viewed normal to a plane of the front wheel, and wherein the crown substantially fills a gap between the front wheel and the down tube; and
  one or more elongate fork blades protruding in a generally forward direction from the distal end portion of the crown, the front wheel being rotatably coupled to the one or more fork blades.

* * * * *